(12) United States Patent
Park et al.

(10) Patent No.: US 9,525,474 B2
(45) Date of Patent: Dec. 20, 2016

(54) METHOD FOR PERFORMING CHANNEL SOUNDING IN WIRELESS LAN SYSTEM AND APPARATUS FOR SUPPORTING SAME

(71) Applicant: LG Electronics Inc., Seoul (KR)

(72) Inventors: Jong Hyun Park, Gyeonggi-do (KR); Hyang Sun You, Gyeonggi-do (KR); Yong Ho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 14/360,506

(22) PCT Filed: Nov. 22, 2012

(86) PCT No.: PCT/KR2012/009940
§ 371 (c)(1),
(2) Date: May 23, 2014

(87) PCT Pub. No.: WO2013/077651
PCT Pub. Date: May 30, 2013

(65) Prior Publication Data
US 2014/0348097 A1    Nov. 27, 2014

Related U.S. Application Data

(60) Provisional application No. 61/563,540, filed on Nov. 24, 2011.

(51) Int. Cl.
*H04L 27/26* (2006.01)
*H04B 7/06* (2006.01)
*H04L 25/02* (2006.01)
(Continued)

(52) U.S. Cl.
CPC ........... *H04B 7/0626* (2013.01); *H04L 1/0009* (2013.01); *H04L 1/08* (2013.01);
(Continued)

(58) Field of Classification Search
None
See application file for complete search history.

(56) References Cited

U.S. PATENT DOCUMENTS 9,246,563 B2 * 1/2016 Lee ..................... H04B 7/0452
2007/0189408 A1 8/2007 Waxman
(Continued)

FOREIGN PATENT DOCUMENTS

KR    1020110051129 A    5/2011

*Primary Examiner* — Gregory Sefcheck
*Assistant Examiner* — Jenkey Van
(74) *Attorney, Agent, or Firm* — Dentons US LLP

(57) ABSTRACT

The present invention relates to a method of performing channel sounding in a wireless LAN system. The method includes transmitting a Null Data Packet Announcement (NDPA) frame for providing notice of an NDP to be transmitted, and transmitting the NDP and receiving a feedback frame from a station (STA). The feedback frame includes channel state information created on the basis of the NDP. The NDP includes a signal field and at least one long training field (LTF) for a multiple input multiple output channel. The signal field includes a repetitive instruction subfield. The repetitive instruction subfield provides instruction on whether orthogonal frequency division multiplexing (OFDM) symbol repetition is applied to the at least one LTF.

16 Claims, 12 Drawing Sheets

(51) Int. Cl.
*H04L 1/00* (2006.01)
*H04L 1/08* (2006.01)
*H04L 5/00* (2006.01)
*H04W 84/12* (2009.01)

(52) U.S. Cl.
CPC .......... *H04L 5/0048* (2013.01); *H04L 5/0053* (2013.01); *H04L 25/0226* (2013.01); *H04L 27/2646* (2013.01); *H04L 5/0007* (2013.01); *H04L 27/2613* (2013.01); *H04W 84/12* (2013.01)

(56) References Cited

U.S. PATENT DOCUMENTS

| | | |
|---|---|---|
| 2010/0271992 A1 | 10/2010 | Wentink et al. |
| 2011/0075607 A1 | 3/2011 | Kim et al. |
| 2011/0128929 A1 | 6/2011 | Liu et al. |
| 2011/0255488 A1* | 10/2011 | Lee ................. H04L 5/0048 370/329 |
| 2011/0299480 A1* | 12/2011 | Breit ................. H04B 7/0626 370/329 |
| 2012/0201315 A1* | 8/2012 | Zhang ................. H04L 1/0046 375/260 |
| 2012/0207140 A1* | 8/2012 | Yu ................. H04L 1/0027 370/338 |
| 2012/0300874 A1* | 11/2012 | Zhang ................. H04L 5/0048 375/295 |
| 2012/0320889 A1* | 12/2012 | Zhang ................. H04L 1/004 370/338 |
| 2012/0327870 A1* | 12/2012 | Grandhi ................. H04W 28/06 370/329 |
| 2012/0327871 A1* | 12/2012 | Ghosh ................. H04L 5/0023 370/329 |
| 2013/0016642 A1* | 1/2013 | Banerjea ................. H04L 27/2613 370/311 |
| 2013/0044607 A1* | 2/2013 | Liu ................. H04W 8/26 370/242 |
| 2013/0044743 A1* | 2/2013 | Zhang ................. H04W 28/18 370/338 |
| 2013/0107893 A1* | 5/2013 | Zhang ................. H04L 1/00 370/474 |
| 2013/0121243 A1* | 5/2013 | Vermani ................. H04L 1/0029 370/328 |

* cited by examiner

METHOD FOR PERFORMING CHANNEL SOUNDING IN WIRELESS LAN SYSTEM AND APPARATUS FOR SUPPORTING SAME

This application is a 35 U.S.C. §371 National Stage entry of International Application No. PCT/KR2012/009940, filed Nov. 22, 2012, which claims the benefit of priority of U.S. Provisional application 61/563,540 on Nov. 24, 2011, both of which are incorporated by reference in their entirety herein.

BACKGROUND OF THE INVENTION

Field of the Invention

The present invention relates to a wireless communication, and more particularly, to a method for performing channel sounding in a wireless LAN system and an apparatus for supporting the same.

Related Art

In recent years, with development of information communication technology, various wireless communication technologies have been developed. Among them, a wireless local area network (WLAN) is technology that can wirelessly access the Internet in a home or an enterprise, or a specific service providing area by using a portable terminal a personal digital assistant (PDA), a laptop computer, a portable multimedia player (PMP), or the like based on radio frequency technology.

As the existing wireless LAN system that supports high throughput (HT) and very high throughput, a wireless LAN system that can be operated in a band of 1 GHz or less unlike using a bandwidth of 20/40/80/160/80+80 MHz of a 2 GHz and/or 5 GHz band. When the wireless LAN system is operated in the band of 1 GHz or less, a channel which is considerably narrower than the existing wireless LAN system is used. As a result, service coverage can be extended as compared with service coverage of the existing wireless LAN system.

Meanwhile, when a frequency band based on operation of the wireless LAN system is changed, a format of a physical layer data unit suitable for a changed characteristic of a physical layer needs to be proposed. Further, a channel sounding method that can support channel state information in a changed channel band to be fed back is requested.

SUMMARY OF THE INVENTION

An object of the present invention is to provide a method for performing channel sounding in a wireless LAN system and an apparatus for supporting the same.

In accordance with an aspect of the present invention, there is provided a method for performing channel sounding in a wireless LAN system. The method includes transmitting a null data packet announcement (NDPA) frame that notifies a null data packet (NDP); transmitting the NDP; and receiving a feedback frame from a station (STA). The feedback frame may include channel state information generated based on the NDP. The NDP may include at least one long training field (LTF) for a signal field and a multiple input multiple output (MIMO) channel. The signal field may include a repetition indication subfield. The repetition indication subfield may indicate whether orthogonal frequency division multiplexing (OFDM) symbol repetition is applied to the at least one LTF.

When the repetition indication subfield indicates that the OFDM symbol repetition is not applied, the signal field may be transmitted as an OFDM symbol for the signal field and a repetition OFDM symbol in which the signal field is repeated, and the at least one LTF may be transmitted as a long training symbol (LTS) for each LTF.

A double guard interval (DGI) may be inserted into the LTS.

When the repetition indication subfield indicates that the OFDM symbol repetition is applied, the at least one LTF may be transmitted as a long training symbol (LTS) for each LTF and as a repetition LTS for a repetition LTF in which each LTF is repeated.

A long guard interval (LGI) may be inserted into the LTS and the repetition LTS.

A double guard interval (DGI) may be inserted into the LTS.

The long guard interval (LGI) may be inserted into the LTS.

The NDPA frame, the NDP, and the feedback frame may be transmitted through a 1 MHz channel in a frequency band of 1 GHz or less.

In accordance with another aspect of the present invention, there is provided a wireless apparatus that operates in a wireless LAN system. The wireless apparatus includes: a transceiver which transmits and receives a radio signal; and a processor which operates in functional association with the transceiver. The processor may be set to transmit a null data packet announcement (NDPA) frame that notifies a null data packet (NDP), transmit the NDP, and receive a feedback frame from a station (STA). The feedback frame may include channel state information generated based on the NDP. The NDP may include at least one long training field (LTF) for a signal field and a multiple input multiple output (MIMO) channel. The signal field may include a repetition indication subfield. The repetition indication subfield may indicate whether orthogonal frequency division multiplexing (OFDM) symbol repetition is applied to the at least one LTF.

The present invention provides a physical data unit and a channel sounding method that can be applied to a wireless LAN system using a channel bandwidth of 1 MHz in a band of 1 GHz or less. A channel sounding procedure can be provided, which has low feedback complexity to which a physical layer characteristic of a next-generation wireless LAN system transmitting and receiving a radio signal is reflected through a narrower bandwidth than the existing wireless LAN system.

DESCRIPTION OF EXEMPLARY EMBODIMENTS

Figure 1:
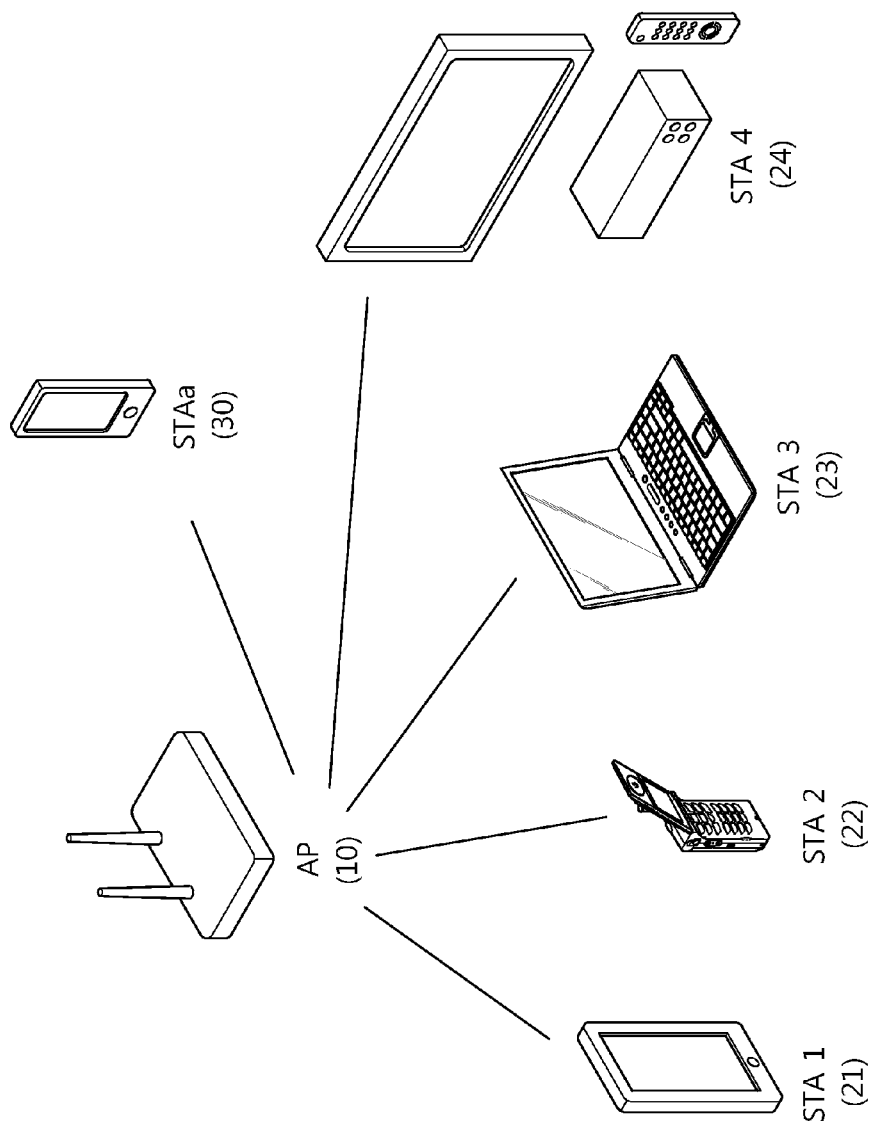
FIG. 1 is a diagram illustrating a configuration of a general wireless local area network (WLAN) according to an exemplary embodiment of the present invention.

FIG. 1 is a diagram illustrating a configuration of a general wireless local area network (WLAN) according to an exemplary embodiment of the present invention.

Referring to FIG. 1, the wireless LAN system includes one or more basic service sets (BSSs). The BSS as a set of stations (STAs) that are successfully synchronized to communicate with each other is not a concept that indicates a specific area.

An infrastructure BSS includes one or more non-AP stations (a non-APSTA1 21, a non-APSTA2 22, a non-APSTA3 23, a non-AP STA4 24, and a non-APSTAa 30), an access point (AP) 10, and a distribution system (DS) that connects a plurality of APs. In the infrastructure BSS, the AP manages the non-APSTAs of the BSS.

On the contrary, an independent BSS (IBSS) is a BSS that operates in an Ad-Hoc mode. Since the IBSS does not include the AP, there is no centralized management entity that performs a management function at the center. That is, in the IBSS, the non-AP STAs are managed by a distributed manner. In the IBSS, all STAs may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium includes all of the Aps and the non-AP stations.

The non-AP STA as not the AP but the STA may be called a mobile terminal, a wireless device, a wireless transmit/receive unit (WTRU), user equipment (UE), a mobile station (MS), a mobile subscriber unit, or even another name such as a user, or the like. Hereinafter, the non-AP STA will be designated as the STA for easy description.

The AP is a functional medium that provides an access to the DS via the radio medium for the STA associated to the corresponding AP. In the infrastructure BSS including the AP, there is a principle that the communication among the STAs is performed via the AP, but when a direct link is set, the STAs may also directly communicate with each other. The AP may also be called a central controller, a base station (BS), a node-B, a base transceiver system (BTS), a site controller, or a management STA.

A plurality of infrastructure BSSs including the BSS illustrated in FIG. 1 may be connected to each other through the distribution system (DS). The plurality of BSSs connected through the DS is called an extended service set (ESS). The Aps and/or STAs included in the ESS may communicate with each other, and in the same ESS, the STA may move to another BSS from one BSS during seamless communication.

In the wireless LAN system according to IEEE 802.11, a basic access mechanism of a medium access control (MAC) is a carrier sense multiple access with collision avoidance (CSMA/CA) mechanism. The CSMA/CA mechanism is also called a distributed coordination function (DCF) of the IEEE 802.11 MAC and basically adopts a "listen before talk" access mechanism. According to this type of access mechanism, the AP and/or STA sense the radio channel or medium before starting transmission. As a sensing result, when it is judged that a medium is in an idle status, frame transmission is started through the corresponding medium. On the contrary, when it is sensed that the medium is in an occupied status, the corresponding AP and/or STA does not start transmission thereof but waits for the medium access by setting a delay period for the medium access.

The CSMA/CA mechanism includes even virtual carrier sensing in addition to physical carrier sensing in which the AP and/or STA directly senses the medium. The virtual carrier sensing is used for complementing a problem which may occurs in terms of the medium access, such as a hidden node problem, or the like. The MAC of the wireless LAN system uses a network allocation vector (NAV), for the virtual carrier sensing. The NAV is a value in which the AP and/or STA using a current medium or has an authority to be used indicates a time that remains until the medium becomes a usable state to another AP and/or STA. Accordingly, the value set as the NAV corresponds to a period in which the use of the medium is scheduled by the AP and/or STA that transmits the corresponding frame.

An IEEE 802.11 MAC protocol provides a hybrid coordination function (HCF) based on a point coordination function which is periodically polled so that all receiving APs and/or STAs may receive a data packet in a synchronous access scheme based on the DCF and polling together with the DCF. The HCF has an enhanced distributed channel access (EDCA) in which an access scheme for a provider to provide the data packet to a plurality of users is based on contention and an HCF controlled channel access (HCCA) using a contention free based channel access scheme using a polling mechanism. The HCF may include a medium access mechanism for improving a quality of service (QoS) of a wireless LAN and transmit QoS data in both a contention period (CP) and a contention free period (CFP).

In a wireless communication system, when power of the STA is turned on and an operation of the STA is started in terms of a characteristic of the radio medium, existence of a network may not directly be known. Accordingly, even any type of STA should perform a network discovery process in order to access the network. The STA that discovers the network through the network discovery process selects a network which the STA will join through a network selection process. Thereafter, the STA performs a data exchange operation which is performed in a transmitter/receiver by joining the selected network.

In the wireless LAN system, the network discovery process is implemented by a scanning procedure. The scanning procedure is divided into passive scanning and active scanning. The passive scanning is performed based on a beacon frame which the AP periodically broadcasts. In general, the AP of the wireless LAN broadcasts the beacon frame every specific interval (for example, 100 msec). The beacon frame includes information on a BSS managed thereby. The STA passively stands by for receiving the beacon frame in a specific channel. The STA that acquires information on the network through receiving the beacon frame ends the scanning procedure in the specific channel. Since the passive scanning is performed only when the STA receives the beacon frame without transmitting a separate frame, overall overhead is small. However, a scanning execution time is increased in proportion to the transmission period of the beacon frame.

In the active scanning, the STA actively broadcasts a probe request frame in the specific channel to request the network information from all APs that receive the broadcasted probe request frame. The AP that receives the probe request frame the network information included in a probe response frame to the corresponding STA after the AP stands by for a random time in order to prevent a frame collision. The STA ends the scanning procedure through acquiring the network information by receiving the probe response frame. The active scanning has an advantage that scanning may be ended within a relatively early time. On the contrary, since a frame sequence depending on a request/a response is required, overall network overhead is increased.

The STA that completes the scanning procedure selects the network according to a specific reference and thereafter, performs an authentication procedure with the AP. The authentication procedure is configured by a 2-way handshake. The STA that completes the authentication procedure performs an association procedure with the AP.

The association procedure is configured by the 2-way handshake. First, the STA transmits an association request frame to the AP. Information on capabilities of the STA is included in the association request frame. The AP determines whether the AP is permitted to be associated with the corresponding STA based on the capabilities information. The AP that determines whether the association is permitted transmits an association response frame to the corresponding STA. The association response frame includes information that indicates whether the association is permitted and information that indicates a reason in succeeding/failing in the association. The association response frame further includes information on capabilities which may be supported by the AP. When the association is successfully completed, the frame is normally exchanged between the AP and the STA. When the association is failed, an association procedure may be attempted again based on information on the failure reason included in the association response frame or the STA may request the association to other AP.

In order to overcome a limit in communication speed pointed out as a weak point in the wireless LAN, IEEE 802.11n is provided as a technological standard which has been established comparatively recently. IEEE 802.11n aims at increasing the speed and the reliability of the network and extending an operation distance of the wireless network. In more detail, IEEE 802.11n supports high throughput (HT) in which a data processing speed is maximum 540 Mbps or higher and is based on multiple inputs and multiple outputs (MIMO) technology using multiple antennas in both a transmitting unit and a receiving unit in order to minimize a transmission error and optimize a data speed.

As propagation of the wireless LAN and further, applications using the wireless LAN are diversified, the need for a new wireless LAN system for supporting higher throughput than the data processing speed supported by IEEE 802.11n has been on the rise. A wireless LAN system that supports very high throughput (VHT) as a next version of the IEEE 802.11n wireless LAN system is one of IEEE 802.11 wireless LAN systems that have been newly proposed in recent years in order to support a data processing speed of 1 Gbps or higher for multiple users and throughput of 500 Mbps or more for a single user at an MAC service access point (SAP).

The VHT wireless LAN system intends to support 80 MHz, contiguous 160 MHz, and non-contiguous 160 MHz bandwidth transmission and/or higher bandwidth transmission as compared with the existing wireless LAN system that supports 20 MHz and 40 MHz. In addition, the VHT wireless LAN system supports 256 QAM further than the existing wireless LAN system that 64 quadrature amplitude modulation (QAM).

Since the VHT wireless LAN system supports a multi user-multiple input multiple output (MU-MIMO) transmission method for higher throughput, the AP may transmit the data frame simultaneously to one or more STAs which are MIMO-paired. The maximum number of the paired STAs may be 4, and when the maximum number of spatial streams is 8, maximum 4 spatial streams may be allocated.

Referring back to FIG. 1, in the wireless LAN system illustrated in the figure, the AP 10 may simultaneously transmit data to an STA group including at least one STA of a plurality of STAs 21, 22, 23, 24, and 30 associated therewith. In FIG. 1, it is illustrated that the AP performs MU-MIMO transmission to the STAs, but in a wireless LAN system that supports a tunneled direct link setup (TDLS), a direct link setup (DLS), or a mesh network, the STA that intends to transmit data may transmit a PPDU to the plurality of STAs by using an MU-MIMO transmission technique. Hereinafter, it will be described as an example that the AP transmits the PPDU to the plurality of STAs according to the MU-MIMO transmission technique.

The data transmitted to the respective STAs may be transmitted through different spatial streams. The data packet transmitted by the AP 10 as the PPDU generated and transmitted in the physical layer of the wireless LAN system or a data field included in the PPDU may be mentioned as a frame. That is, the PPDU for single user (SU)-MIMO and/or MU-MIMO or the data field included in the PPDU may be an MIMO packet. Among them, the PDDU for the MU-MIMO may be called an MU packet. In the example of the present invention, it is assumed that an STA group as a transmission target MU-MIMO paired with the AP 10 includes an STA1 21, an STA2 22, an STA3 23, and an STA4 24. In this case, since no spatial stream is allocated to a specific STA of the transmission target STA group, the data may not be transmitted to the specific STA. Meanwhile, it is assumed that an STAa 30 is an STA that is associated with the AP, but is not included in the transmission target STA group.

In the wireless LAN system, an identifier may be allocated to the transmission target STA group for supporting the MU-MIMO transmission and the identifier is called a group identifier (ID). The AP transmits a group ID management frame including group definition information in order to allocate the group ID to the STAs that support the MU-MIMO transmission and the group ID is thus allocated to the STAs prior PPDU transmission. A plurality of group IDs may be allocated to one STA.

Table 1 shown below represents information elements included in the group ID management frame.

TABLE 1

| Order | Information |
|---|---|
| 1 | Category |
| 2 | VHT action |
| 3 | Membership status |
| 4 | Spatial stream position |

In a category field and a VHT action field, a relevant frame corresponds to a management frame and is set to identify the group ID management frame used in the next-generation wireless LAN system that supports the MU-MIMO.

As shown in Table 1, the group definition information includes membership status information that indicates whether the corresponding STA belongs to a specific group ID and spatial stream position information that indicates to which position a spatial stream set of the corresponding STA corresponds in all spatial streams depending on the MU-MIMO transmission when the corresponding STA belongs to the corresponding group ID.

Since one AP manages a plurality of group IDs, the membership status information provided to one STA needs to indicate whether the STA belongs to each of the group IDs managed by the AP. Therefore, the membership status information may exist in an array type of subfields that indicate whether the STA belongs to each group ID. Since the spatial stream position information indicates a position of each group ID, the spatial stream information position may exist in the array type of subfields that indicate positions of spatial stream sets occupied by the STA for the respective group IDs. Further, the membership status information and the spatial stream position information for one group ID may be implemented within one subfield.

The AP transmits information that indicates the group ID in the PPDU as control information when transmitting the PPDU to the plurality of STAs through the MU-MIMO transmission technique. When the STA receives the PPDU, the STA verifies the group ID field to verify whether the STA itself is a member STA of the transmission target STA group. When the STA verifies that the STA itself is the member of the transmission target STA group, the STA may verify at which stream of all spatial streams a spatial stream set transmitted thereto is positioned. Since the PPDU includes information on the number of spatial streams allocated to the receiving STA, the STA finds spatial streams allocated thereto to receive data.

Meanwhile, as a frequency band which may be newly used in the wireless LAN system, TV white space (WS) attracts public attentions. The TV WS represents a frequency band in an idle status, which remains due to digitalization of a US analog TV and represents, for example, a band of 54 to 698 MHz. However, this is just an example and the TV WS may be a licensed band which a licensed user may preferentially use. The licensed user means a user who is licensed to use the licensed band and may be called other names including a licensed device, a primary user, an incumbent user, and the like.

An AP and/or an STA that operates in the TV WS needs to provide a protection function for the licensed user and the reason is that the licensed user is prior in using the TV WS band. For example, when a specific WS channel which is a frequency band divided according to a regulation to have a specific bandwidth in the TV WS band is already used by the licensed user such as a microphone, the AP and/or STA may not use the corresponding frequency band in the corresponding WS channel in order to protect the licensed user. Further, the AP and/or STA needs to stop using the corresponding frequency band when the licensed user uses a frequency band used for frame transmission and/or reception at present.

Accordingly, the AP and/or STA needs to precede a procedure of determining whether to use the specific frequency in the TV WS band, in other words, whether the licensed user exists in the frequency band. Determining whether the licensed user exists in the specific frequency band is called spectrum sensing. As a spectrum sensing mechanism, an energy detection scheme, a signature detection scheme, and the like are used. When an intensity of a received signal is equal to or higher than a predetermined value, it may be judged whether the licensed user is using the specific frequency band or when a DTV preamble is detected, it may be judged that the licensed user is using the specific frequency band.

Figure 2:
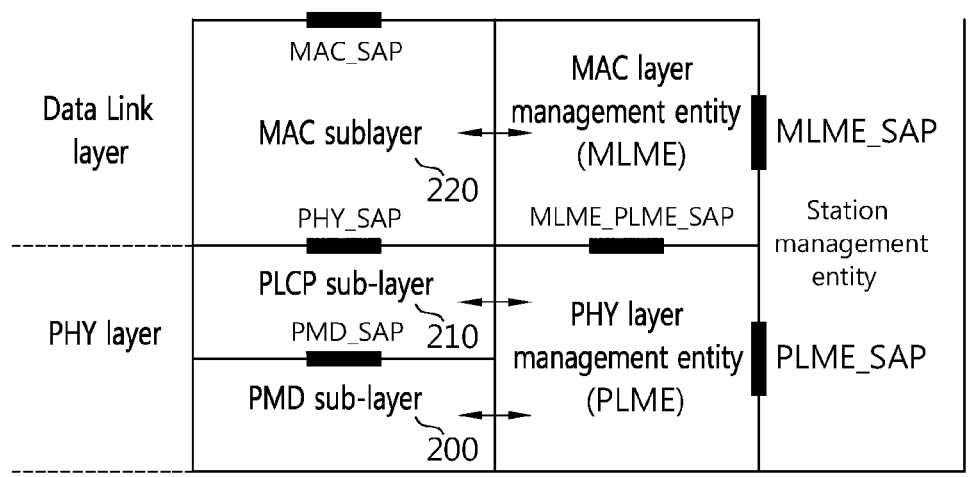
FIG. 2 is a diagram illustrating physical layer architecture of a wireless LAN system supported by IEEE 802.11.

FIG. 2 is a diagram illustrating physical layer architecture of a wireless LAN system supported by IEEE 802.11.

The IEEE 802.11 physical layer architecture is constituted by a PHY layer management entity (PLME), a physical layer convergence procedure (PLCP), a sublayer 210, a physical medium dependent (PMD) sublayer 200. The PLME provides a management function of the physical layer in cooperation with an MAC layer management entity (MLME). The PLCP sublayer 210 transfers to a PMD sublayer an MAC protocol data unit (MPDU) received from the MAC sublayer 220 according to an instruction of the MAC layer between the MAC sublayer 220 and the PMD sublayer 200 or transfers a frame received from the PMD sublayer 200 to the MAC sublayer 220. The PMD sublayer 200 enables transmitting and receiving a physical layer entity between two stations through the radio medium as a PLCP lower layer. The MPDU transferred by the MAC sublayer 220 is called a physical service data unit (PSDU) in the PLCP sublayer 210. The MPDU is similar to the PSDU, but when an aggregated MPDU (A-MPDU) in which a plurality of MPDUs are aggregated is transferred, individual MPDUs and PSDUs may be different from each other.

The PLCP sublayer 210 adds an added field including required information by a physical layer transmitter/receiver while receiving the PSDU from the MAC sublayer 220 and transfers the received PSDU to the PMD sublayer 200. In this case, the added field may be a PLCP preamble, a PLCP header, tail bits required to restore a convolution encoder to a zero state, and the like in the PSDU. The PLCP sublayer 210 receives from the MAC sublayer a TXVECTOR parameter including control information required to generate and transmit the PPDU and control information required for the receiving STA to receive and analyze the PPDU. The PLCP sublayer 210 uses the information included in the TXVECTOR parameter in generating the PPDCU including the PSDU.

The PLCP preamble serves to allow the receiver to prepare for a synchronization function and antenna diversity before the PSDU is transmitted. A data field may include padding bits, a service field including a bit sequence for initializing a scrambler, and a coded sequence in which the bit sequence added with the tail bits is encoded, in the PSDU. In this case, an encoding scheme may be selected as one of binary convolutional coding (BCC) encoding and low density parity check (LDPC) encoding according to an encoding scheme supported in the STA. A field including information on the PLCP protocol data unit (PPDU) to be transmitted is included in the PLCP header and this will be hereinafter described in more detail with reference to FIGS. 3 and 4.

In the PLCP sublayer 210, the aforementioned filed is added to the PSDU to generate the PLCP protocol data unit (PPDU) and transmit the generated PPDU to the receiving station through the PMD sublayer and the receiving station receives the PPDU to acquire the received PPDU by acquiring information required for data restoration from the PLCP preamble and the PLCP header. The PLCP sublayer of the receiving station transfers an RXVECTOR parameter including control information included in the PLCP preamble and the PLCP header to the MAC sublayer to analyze the PPDCU and acquire data in a reception state.

Figure 3:
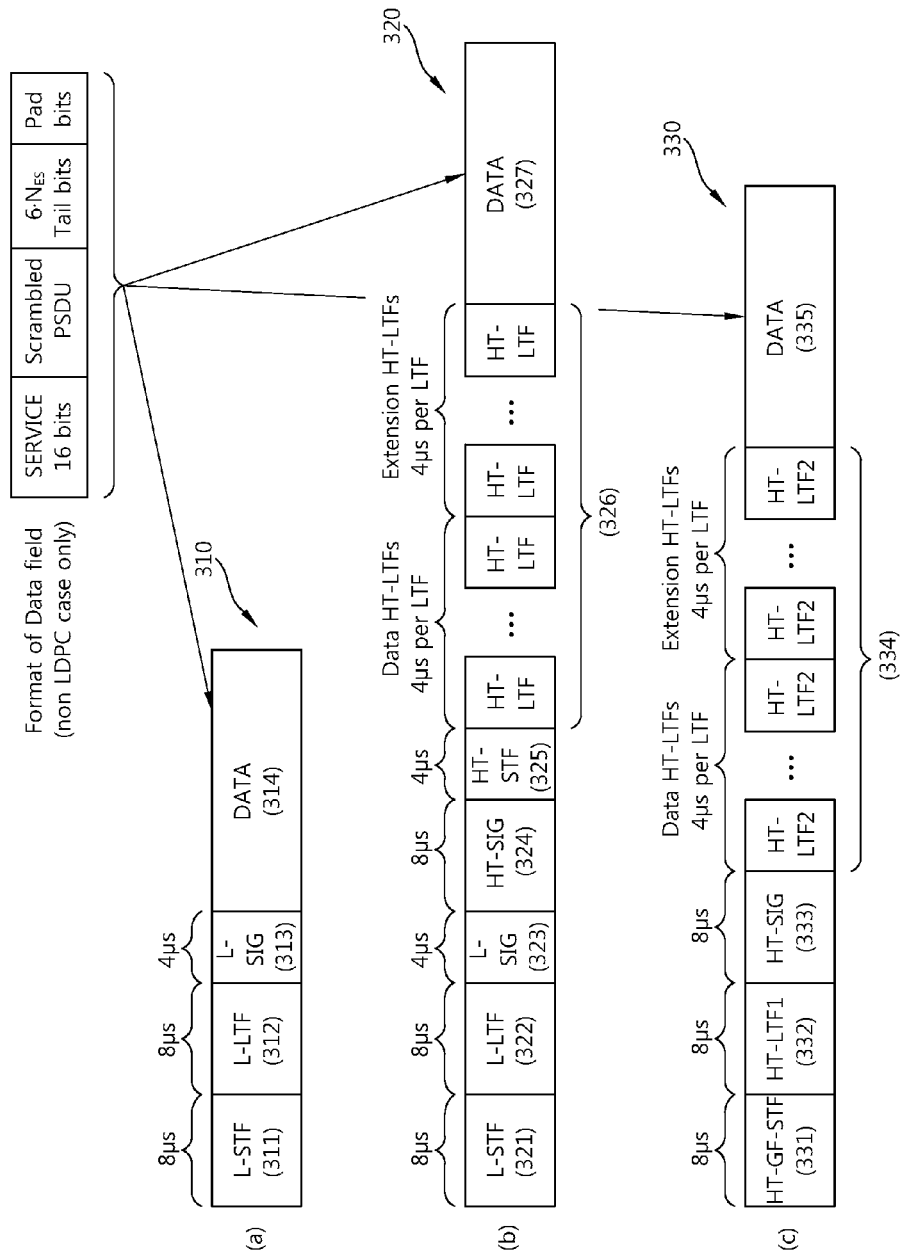
FIGS. 3 and 4 are block diagrams illustrating a format of a PPDU used in the wireless LAN system according to the exemplary embodiment of the present invention.
Figure 4:
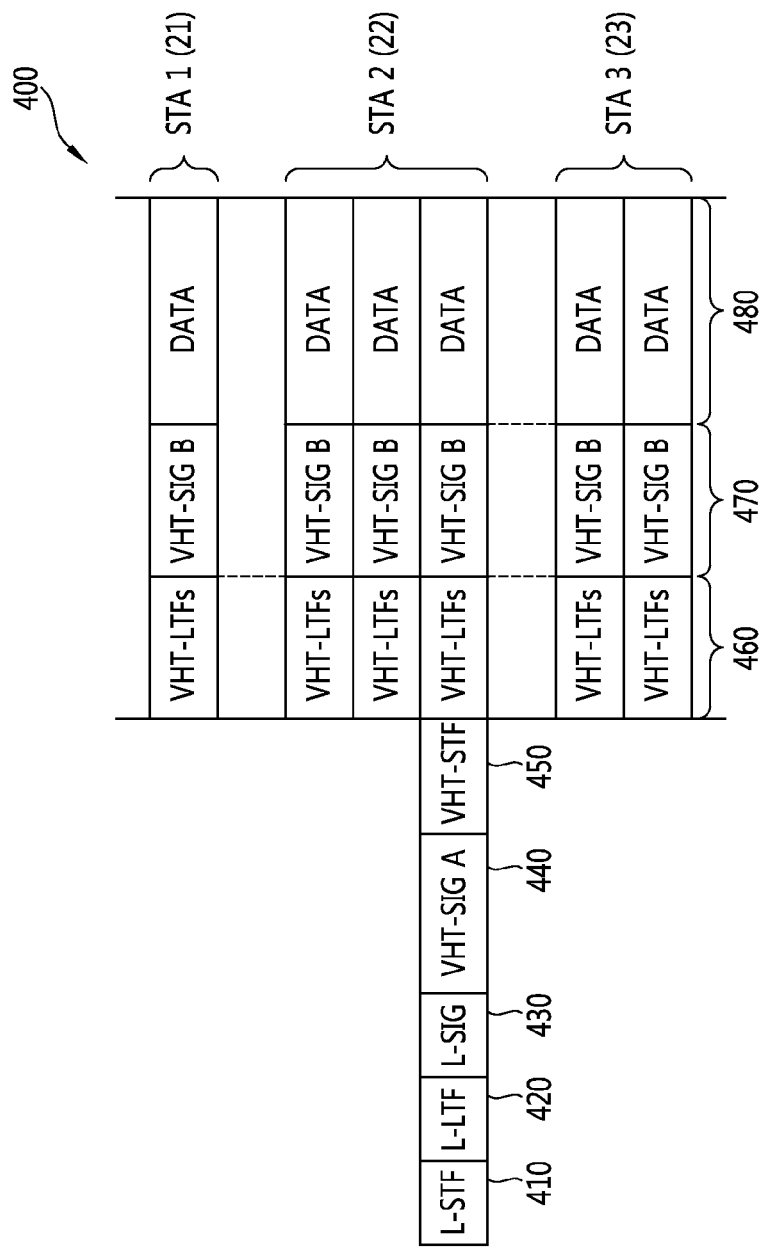

FIGS. 3 and 4 are block diagrams illustrating a format of a PPDU used in the wireless LAN system according to the exemplary embodiment of the present invention. Hereinafter, an STA that operates in a legacy wireless LAN system based on IEEE 802.11a/b/g which is the existing wireless LAN standard before IEEE 802.11n is called a legacy STA (L-STA). Further, it is assumed that an STA that may support the HT in an HT wireless LAN system based on IEEE 802.11n is an HT-STA.

A subfigure (a) of FIG. 3 illustrates a legacy PPDU (L-PPDU) which is used in IEEE 802.11a/b/g which is the existing wireless LAN system standard before IEEE 802.11n. Accordingly, the legacy STA (L-STA) may transmit and receive having such a format in the HT wireless LAN system to which the IEEE 802.11n standard is applied.

Referring to the subfigure (a), the L-PPDU 310 includes an L-STF 311, an L-LTF 312, an L-SIG field 313, and a data field 314.

The L-STF 311 is used for frame timing acquisition, automatic gain control convergence, coarse frequency acquisition, and the like.

The L-LTF 312 is used for frequency offset and channel estimation.

The L-SIG field 313 includes control information for demodulating and decoding the data field 314.

The L-PPDU may be transmitted in the order of the L-STF 311, the L-LTF 312, the L-SIG field 313, and the data field 314.

A subfigure (b) is a block diagram of an HT mixed PPDU format that allows the L-STA and the HT-STA to coexist. Referring to the subfigure (b), the HT mixed PPDU 320 includes an L-STF 321, an L-LTF 322, an L-SIG 323, an HT-SIG 324, an HT-STF 325, and a plurality of HT-LTFs 326 and data fields 327.

The L-STF 321, the L-LTF 322, and the L-SIG 323 are the same as the fields represented by reference numerals 311, 312, and 313 of the subfigure (a), respectively. Accordingly, the L-STA may analyze the data field through the L-LTF 322, the L-LTF 322, and the L-SIG 323 in spite of receiving the HT mixed PPDU 320. However, the L-LTF 323 may further include information for channel estimation to be performed in order for the HT-STA to receive the HT mixed PPDU 320 and decipher the L-SIG field 323, the HT-SIG 324, and the HT-STF 325.

The HT-STA may know that the HT mixed PPDU 320 is an PPDU therefor through the HT-SIG 324 after the L-SIG 323, and demodulate and decode the data field 327 based thereon.

The HT-STF 325 may be used for frame timing synchronization, AGC convergence, and the like for the ST-STA.

The HT-LTF 326 may be used in channel estimation for demodulating the data field 327. Since IEEE 802.11n supports the SU-MIMO, the HT-LTF 326 may be configured in plural for the channel estimation for respective data fields transmitted to the plurality of spatial streams.

The HT-LTF 326 may be constituted by a data HT-LTF used for the channel estimation for the spatial stream and an extension HT-LTF additionally used for full channel sounding. Accordingly, the plurality of HT-LTFs 326 may be equal to or more than the transmitted spatial streams.

In the HT mixed PPDU 320, the L-STF 321, the L-LTF 322, and the L-SIG field 323 are first transmitted in order to acquire data by receiving even the L-STA. Thereafter, the HT-SIG field 324 is transmitted to demodulate and decode data transmitted for the HT-STA.

Even the HT-SIG field 324 is not beamformed but transmitted to allow the L-STA and the HT-STA to acquire data by receiving the corresponding PPDU and thereafter, the transmitted HT-STF 325, HT-LTF 326, and data field 327 are subjected to radio signal transmission through precoding. Herein, the STA that receives data through the precoding transmits the HT-STF 325 so as to consider a part where power by the precoding is varied and thereafter, transmits the plurality of HT-LTFs 326 and data fields 327.

In the HT wireless LAN system, although the HT-STA using 20 MHz uses 52 data subcarriers per OFDM symbol, the L-STA using the same 20 MHz still uses 48 data subcarriers per OFDM symbol. Since the HT-SIG field 324 is decoded by using the L-LTF 322 in the format of the HT mixed PPDU 320 in order to support backward with the existing system, the HT-SIG field 324 is constituted by 48×2 data subcarriers. Thereafter, the HT-SIF 325 and the HT-LTF 326 are constituted by 52 data subcarriers per OFDM symbol. As a result, since the HT-SIG field 324 is supported by ½, binary phase shift keying (BPSK), each HT-SIG field 324 is configured in 24 bits to be transmitted in total 48 bits. That is, the L-LTF 322 is used in channel estimation for the L-SIG field 323 and the HT-SIG field 324 and bit columns constituting the L-LTF 322 are expressed as shown in Equation 1. The L-LTF 322 is constituted by 48 data subcarriers other than DC subcarriers per symbol.

$$L_{-26,26}=\{1,1,-1,-1,1,1,1,1,1,1,1,1,1,1,1,1,1,1,1,$$
$$1,1,-1,1,1,1,1,0,1,-1,-1,1,1,-1,1,-1,1,-1,$$
$$-1,-1,-1,-1,1,1,1,1,1,1,1,1,-1,1,1,1,1\} \quad \text{[Equation 1]}$$

A subfigure (c) is a block diagram illustrating a format of an HT-greenfield PPDU 330 which can be used by only the HT-STA. Referring to the subfigure (c), an HT-GF PDDU 330 includes an HT-GF PPDU 330, an HT-GF-STF 331, an HT-LTF1 332, an HT-SIG 333, and a plurality of HT-LTFs 334 and data fields 335.

The HT-GF-STF 331 is used for the frame timing acquisition and the AGC.

The HT-LTF1 332 is used for the channel estimation.

The HT-SIG 333 is used to demodulate and decode the data field 335.

The HT-LTF2 334 is used in channel estimation for demodulating the data field 335. Similarly, since the HT-STA uses the SU-MIMO, the channel estimation is required for the respective data fields transmitted to the plurality of spatial streams, and as a result, the HT-LTF 326 may be configured in plural.

The plurality of HT-LTFs2 334 may be constituted by a plurality of data HT-LTFs and a plurality of extension HT-LTFs, similarly as the HT-LTF 326 of the HT mixed PPDU 320.

Each of the respective data fields 314, 327, and 335 illustrated in the subfigures (a), (b), and (c) may include a service field, a scrambled PSDU, a tail bit, and a padding bit. The service field may be used to initialize the scrambler. The service field may be set as 16 bits. In this case, bits for initializing the scrambler may be implemented by 7 bits. The tail field may be configured by a bit sequence required to restore the convolution encoder to 0. The tail field may be allocated with a bit size proportional to the number of binary convolutional code (BCC) encoders used to encode data to be transmitted and in more detail, may be implemented to have 6 bits per the number of BCCs.

FIG. 4 is a diagram illustrating one example of a format of a PPDU used in a wireless LAN system that supports VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

A PLCP sublayer configuring a PHY is converted into the data field 480 by adding required information to a PSDU received from an MAC layer, generates the PPDU 400 by adding the fields such as the L-STF 410, the L-LTF 420, the L-SIG field 430, the VHT-SIGA field 440, the VHT-STF 450, the VHT-LTF 460, the VHT-SIGB field 470, and the like to generate the PPDU 400 and transmits the generated PPDU 400 to one or more STAs through a PMD sublayer configuring the PHY. Control information required for the PLCP sublayer to generate the PPDU and control information which is included in the PPDU to be transmitted and is used for the receiving STA to analyze the PPDCU is provided from a TXVECTOR parameter received from the MAC layer.

The L-STF 410 is used for the frame timing acquisition, the automatic gain control convergence, the coarse frequency acquisition, and the like.

The L-LTF 420 is used to channel estimation for demodulating the L-SIG field 430 and the VHT-SIGA field 440.

The L-SIG field 430 is used for the L-STA to receive the PPDU 400 and analyze the received PPDU 400 to acquire data. The L-SIG field 430 includes a rate sub field, a length sub field, and a parity bit and tail field. The rate sub field is set as a value that indicates bit rate for data to be transmitted at present.

The length sub field is set as a value that indicates an octet length of the PSDU which the MAC layer requests transmitting to the PHY layer. In this case, a L_LENGTH parameter which is a parameter associated with information on the octet length of the PSDU is determined based on a TXTIME parameter which is a parameter associated with a transmission time. The TXTIME represents a transmission time determined for the PHY layer to transmit the PPDU including the PSDU to correspond to a transmission time requested for transmitting the physical service data unit (PSDU). Accordingly, since the L_LENGTH parameter is a parameter associated with time, the length sub field included in the L-SIG field 430 includes information associated with the transmission time.

The VHT-SIGA field 440 includes control information or signal information required for the STAs receiving the PPDU to analyze the PPDU 400. The VHT-SIGA field 440 is transmitted as two OFDM symbols. As a result, the VHT-SIGA field 440 may be divided into a VHT-SIGA1 field and a VHT-SIGA2 field. The VHT-SIGA1 field includes channel bandwidth information used for transmitting the PPDU, identification information associated with whether to use space time block coding (STBC), information indicating a scheme in which the PPDU is transmitted between the SU and MU-MIMOs, information indicating a transmission target STA group as a plurality of STAs MU-MIMO paired with the AP when the transmission method is the MU-MIMO, and information on spatial streams allocated to the respective STAs included in the transmission target STA group. The VHT-SIGA2 field includes information associated with a short guard interval (SGI).

The information indicating the MIMO transmission scheme and the information indicating the transmission target STA group may be implemented as one MIMO indication information and as an example, the information may be implemented as a group ID. The group ID may be set as a value having a specific range and a specific value in the range indicates the SU-MIMO transmission technique and other values may be as an identifier for the corresponding transmission target STA group when the PPDU 400 is transmitted by the MU-MIMO transmission technique.

When the group ID indicates that the corresponding PPDU 400 is transmitted through the SU-MIMO transmission technique, the VHT-SIGA2 field includes coding indication information that indicates whether the coding technique applied to the data field is the binary convolution coding (BCC) or low density parity check (LDPC) coding and modulation coding scheme (MCS) information for a transmitter-receiver channel. Further, the VHT-SIGA2 field may include an AID of a PPDU transmission target STA and/or a partial AID including a partial bit sequence of the AID.

When the group ID indicates that the corresponding PPDU 400 is transmitted through the MU-MIMO transmission technique, the VHT-SIGA field 440 includes the coding indication information that indicates whether the coding technique applied to the data field which intends to be transmitted to the receiving STAs MU-MIMO paired is the BCC or the LDPC coding. In this case, modulation coding scheme (MCS) information for each receiving STA may be included in the VHT-SIGB field 470.

The VHT-STF 450 is used to improve performance of AGC estimation in MIMO transmission.

The VHT-LTF 460 is used for the STA to estimate an MIMO channel. Since the next-generation wireless LAN system supports the MU-MIMO, the VHT-LTFs 460 may be set as many as the spatial streams to which the PPDU 400 is transmitted. Additionally, the full channel sounding is supported and when the full channel sounding is performed, the number of VHT LTFs may be increased.

The VHT-SIGB field 470 includes dedicated control information required for the plurality of MIMO paired STAs to acquire data by receiving the PPDU 400. Therefore, only when the control information included in the VHT-SIGA field 440 indicates that the PPDU 400 received at present is MU-MIMO transmitted, the STA may be designed to decode the VHT SIGB field 470. On the contrary, when the control information included in the VHT-SIGA field 440 indicates that the PPDU 400 received at present is used for the single STA (including the SU-MIMO), the STA may be designed not decode the VHT-SIGB field 470.

The VHT-SIGB field 470 may include information on the modulation and coding scheme (MCS) and information on rate matching for each of the STAs. Further, the VHT-SIGB field 470 may include information that indicates a PSDU length included in the data field for each of the STAs. The information that indicates the length of the PSDU may indicate the length of the PSDU by the octet unit as information that indicates the length of the bit sequence of the PSDU. Meanwhile, when the PPDU is SU-transmitted, the information on the MCS is included in the VHT-SIGA field 440, and as a result, the corresponding information may not be included in the VHT-SIGB field 470. The size of the VHT-SIGB field 470 may vary depending on the type (MU-MIMO or SU-MIMO) of the MIMO transmission and a channel bandwidth used for the PPDU transmission.

The data field 480 includes data that intends to be transmitted to the STA. The data field 480 includes a service field for initializing the PLCP service data unit (PSDU) to which the MAC protocol data unit (MPDU) is transferred in the MAC layer and the scrambler, a tail field including the bit sequence required to restore the convolution encoder to the zero state, and padding bits for standardizing the length of the data field. In the case of the MU transmission, the data unit that is to be transmitted may be included the data field 480 transmitted to each STA and the data unit may be the aggregate MPDU (A-MPDU).

The fields included in each PPDU format illustrated in FIGS. 3 and 4 may be transmitted as the OFDM symbol through processing the physical layer. In particular a data sequence constituting the data field may be transmitted as at least one data OFDM symbol according to the size thereof. Further, normal generation, transmission, reception, and analysis of the data OFDM symbol may be obstructed due to a radio channel state, inconsistency of time synchronization between the transmitter and the receiver, and intersymbol interference. In order to prevent the problem, an abnormal operation which may occur by application of a guard interval (GI) to the data OFDM symbol may be prevented and data unit transmission and reception having high reliability may be guaranteed. Further, in the HT wireless LAN system and the VHT wireless LAN system, the SGI is applied to decrease a time consumed due to the guard interval, thereby guaranteeing more efficient transmission and reception. In the HT wireless LAN system and the VHT wireless LAN system, it may be indicated whether the SGI is applied to the signal field and the VHT-SIGA field.

In the wireless LAN system given as illustrated in FIG. 1, when the AP 10 intends to transmit data to the STA1 21, the STA2 22, and the STA3 23, the AP 10 may transmit the PPDU to the STA group including the STA1 21, the STA2 22, the STA3 23, and the STA4 24. In this case, the spatial stream may be allocated so that there is no spatial stream allocated to the STA4 24 as illustrated in FIG. 4 and spatial streams of a specific number are allocated to the STA1 21, the STA2 22, and the STA3 23, respectively, and as a result, data may be transmitted. In the example illustrated in FIG. 4, it may be known that one spatial stream is allocated to the STA1 21, three spatial streams are allocated to the STA2 22, and two spatial streams are allocated to the STA3 23.

One of largest features of the next-generation wireless LAN system is supporting the MU-MIMI transmission technique of transmitting various spatial streams to the plurality of STAs by using the multiple antennas. This may improve throughput in the whole system. An AP that intends to transmit data under an environment where the plurality of STAs exists transmits the PPDU through a beamforming procedure in order to transmit data to the transmission target STA group. Accordingly, since the AP and/or STA that intends to transmit the PPDU by using the MU-MIMO transmission technique needs channel information for each transmission target STA, performing the channel sounding is required to acquire channel information.

The channel sounding for the MU-MIMO may be started by the transmitter that intends to transmit the PPDU by forming a beam. The transmitter may be expressed as a beamformer and the receiver may be expressed as a beamformee. In the wireless LAN system that supports the DL MU-MIMO, the AP has positions of the transmitter and the beamformer and the channel sounding is started by the AP. The STA has positions of the receiver and the beamformee, and the STA estimates a channel according to the channel sounding started by the AP and reports the estimated channel.

Figure 5:
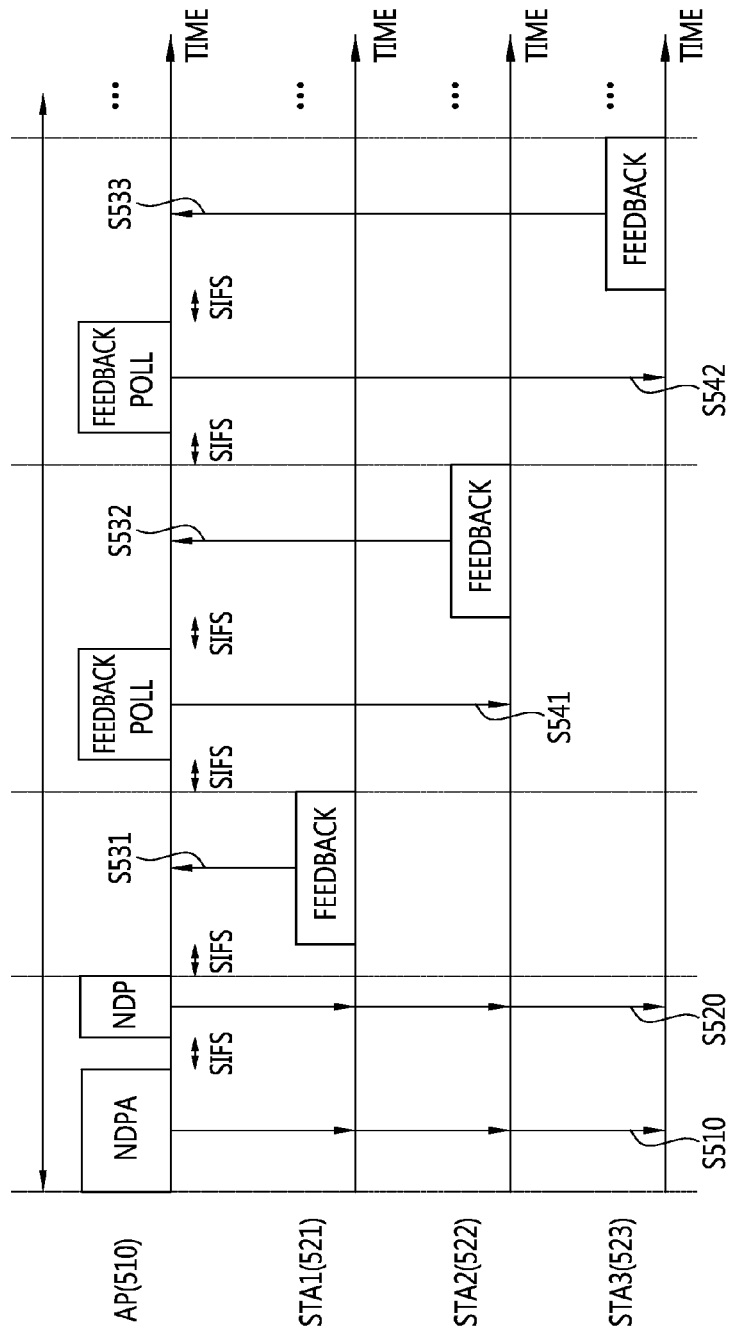
FIG. 5 is a diagram illustrating a channel sounding method using an NDP in a VHT wireless LAN system.

In the VHT wireless LAN system, the channel sounding is performed based on a null data packet (NDP). The NDP has the PPDU format without the data field. The STA performs the channel estimation based on the NDP and feeds back channel state information which is a result the estimation to the AP. The NDP may be expressed as a sounding frame. Referring to FIG. 5, NDP based channel sounding will be described.

FIG. 5 is a diagram illustrating a channel sounding method using an NDP in a VHT wireless LAN system. In this example, the AP performs the channel sounding for three transmission target STAs in order to transmit data to three transmission target STAs. However, the AP may perform the channel sounding for one STA.

Referring to FIG. 5, the AP 510 transmits an NDPA frame to an STA1 521, an STA2 522, and an STA3 523 (S410). The NDP announcement (NDPA) frame notifies that the channel sounding is started (or announce a transmission of NDP) and the NDP is transmitted. The NDPA frame may be called a sounding announcement frame.

The NDPA frame includes information for identifying an STA that will estimate the channel and transmit a feedback frame to the AP. That is, the STA determines whether the STA itself is an STA that participates in the channel sounding by receiving the NDPA frame. As a result, the AP 510 transmits an STA information field including information on a sounding target STA, which is included in the NDPA frame. One STA information field may be included in each sounding target STA. When the NDPA frame is transmitted to at least one STA for the MU-MIMO channel sounding, the AP 510 broadcasts the NDPA frame. On the contrary, when the NDPA frame is transmitted to one target STA for the SU-MIMO channel sounding, the AP 510 may set receiver address information of the NDPA frame as an MAC address of the corresponding target STA and transmit the receiver address information through unicast.

Table 2 shown below illustrates one example of a format of an STA information field included in the NDPA frame.

TABLE 2

| Subfield | Description |
| --- | --- |
| AID | Including AID of sounding target station |
| Feedback type | Indicating feedback request type for sounding target station<br>In case of SU-MIMO, '0'<br>In case of MU-MIMO, '1' |
| Nc index | Indicating requested feedback dimension<br>In case of MU-MIMO:<br>When Nc = 1, '0' is set<br>When Nc = 2, '1' is set<br>When Nc = 3, '2' is set<br>When Nc = 4, '3' is set<br>When Nc = 5, '4' is set<br>When Nc = 6, '5' is set<br>When Nc = 7, '6' is set<br>When Nc = 8, '7' is set<br>In case of SU-MIMO, preliminary subfield (is set to 0) |

In Table 2 shown above, Nc indicates the number of columns of beamforming feedback matrices in feedback information which the sounding target STA receives the NDP and transmits to the AP in response thereto.

The STAs that receive the NDPA frame may verifies an AID subfield value included in the STA information field and verify whether the STAs themselves the sounding target STA. In the exemplary embodiment illustrated in FIG. 5, the NDPA frame may include an STA information field including an AID of the STA1 521, an STA information field including an AID of the STA2 522, and an STA information field including an AID of the STA3 523.

The AP 510 transmits the NDP to the target STA after transmitting the NDPA frame. The NDP may have a format in which the data field is omitted from the PPDU format illustrated in FIG. 4. The NDP frame is precoded based on a specific precoding matrix by the AP 510 and is transmitted to the sounding target STA. Accordingly, the sounding target STAs 521, 522, and 523 estimate the channel based on the VHT-LTF of the NDP and acquires the channel state information.

As control information included in the NDP at the time of transmitting the NDP, information that indicates the PSDU length included in the data field or the length of the aggregate-MAC protocol data unit (A-MPDU) included in the PSDU is set to 0 and information that indicates the number of transmission target STAs of the NDP is set to 1. The group ID that indicates whether the transmission technique used for transmitting the NDP is the MU-MIMO or the SU-MIMO and indicates the transmission target STA group is set to a value that indicates the SU-MIMO transmission. Information that indicates the number of spatial streams allocated to the transmission target STA is set to indicate the number of spatial streams transmitted to the transmission target STA through the MU-MIMO or the SU-MIMO. The channel bandwidth information used for transmitting the NDP may be set to a bandwidth value used for transmitting the NDPA frame.

The STA1 521 transmits the feedback frame to the AP 510 (S531). Channel bandwidth information used for transmitting the feedback frame may be set to be equal to or narrower than the channel bandwidth used for transmitting the NDPA frame.

The AP 510 receives the feedback frame from the STA1 521 and thereafter, transmits a feedback poll frame to the STA2 522 (S541). The feedback poll frame is a frame for the receiving STA to request transmitting the feedback frame. The feedback poll frame is transmitted to the STA that requests transmitting the feedback frame by a unicast scheme. The STA2 522 that receives the feedback poll frame transmits the feedback frame to the AP 510 (S532). Subsequently, the AP 510 transmits the feedback poll frame to the STA3 523 (S542) and transmits the feedback frame to the AP 510 to correspond to the feedback poll frame (S533).

In the wireless LAN system, the channel bandwidth for transmitting data may be diversified. Channel information for the diversified bandwidths may be fed back in order to estimate the channel for the diversified bandwidths. The next-generation wireless LAN system supports 20 MHz, 40 MHz, 80 MHz contiguous 160 MHz, and non-contiguous 160 MHz bandwidths. Therefore, since the channel information for each bandwidth is fed back, channel feedback information may be increased.

In the present invention, the channel state information depending on the channel estimation performed by the STA is transmitted with being included in the feedback frame which the STA transmits to the AP. The channel state information of the feedback frame may be implemented by a channel information field and a channel information control field. Tables 3 and 5 shown below illustrate formats of the channel information control field and the channel information field.

TABLE 3

| Subfield | Description |
| --- | --- |
| Nc index | Indicating the number of columns in beamforming feedback matrix<br>When Nc = 1, 0 is set<br>When Nc = 2, 1 is set<br>. . .<br>When Nc = 8, 7 is set |

TABLE 3-continued

| Subfield | Description |
| --- | --- |
| Nr index | Indicating the number of rows in beamforming feedback matrix<br>When Nr = 1, 0 is set<br>When Nr = 2, 1 is set<br>. . .<br>When Nr = 8, 7 is set |
| Channel bandwidth | Indicating bandwidth of estimated channel<br>0 at 20 MHz<br>1 at 40 MHz<br>2 at 80 MHz<br>3 at 160 MHz or 80 + 80 MHz |
| Grouping, Ng | Indicating subcarrier grouping used for beamforming feedback matrix<br>When Ng = 1, 0 is set<br>When Ng = 2, 1 is set<br>When Ng = 4, 2 is set<br>(3 is preliminary set) |
| Codebook information | Indicating the size of codebook entries |
| MU-scheme | Indicating beamforming feedback for SU-MIMO or beamforming feedback for MU-MIMO |
| Sounding sequence | Sequence number from NDPA that requests feedback |

TABLE 4

| Subfield | Description |
| --- | --- |
| Signal to noise ratio (SNR) of spatial stream 1 | Average SNR on subcarriers in receiver for first spatial stream |
| . . . | . . . |
| SNR of spatial stream Nc | Average SNR on subcarriers in receiver for Nc-th spatial stream |
| Beamforming feedback matrix (subcarrier index 0) | Order of angle of beamforming feedback matrix for corresponding subcarrier |
| Beamforming feedback matrix (subcarrier index 1) | Order of angle of beamforming feedback matrix for corresponding subcarrier |
| . . . | . . . |
| Beamforming feedback matrix (subcarrier index Ns) | Order of angle of beamforming feedback matrix for corresponding subcarrier |

Information of the channel information field disclosed in Table 4 may be analyzed based on information included in the channel control field disclosed in Table 3. As one example, Ns represents the number of subcarriers for a beamforming feedback matrix subfield transmitted back to the beamformer. The beamformee may control a value of Ns through grouping. The value of Ns may vary depending on the channel bandwidth and Ng which is a value of a grouping subfield. Further, Indexes for Ns subcarriers associated with the beamforming feedback matrix are determined depending on the channel bandwidth and the grouping subfield value. Accordingly, the beamformer may know how Ns is determined based on channel bandwidth information and grouping information of the channel information control field by receiving the feedback frame and moreover, know even the indexes of the subcarriers associated with the beamforming feedback matrix.

Meanwhile, in recent years, with appearance of various communication services including smart grid, e-health, and ubiquitous, machine to machine (M2M) technology for supporting the communication services have come into the spotlight. Sensors that sense temperature, humidity, and the like, cameras, home appliances including a TV, and the like, process machines in a factory, large-sized machines such as an automobile may be one of components that constitute an M2M system. The components that constitute the M2M system may transmit and receive data based on WLAN communication. When devices constituting the M2M system support a WLAN and constitute the network, this is called an M2M wireless LAN system.

Features of the wireless LAN system that supports M2M will be described below.

1) Many STAs: In the M2M, it is assumed that many STAs exist in the BSS unlike the existing network. The reason is that all sensors installed in a home, a company, and the like are considered as well as devices possessed by individuals. Therefore, considerably many STAs may access one AP.

2) Low traffic load per each STA: Since an M2M terminal has a traffic pattern of collecting and reporting surrounding information, the M2M terminal need not frequently send the information and the amount of the information is also small.

3) Uplink centered communication: The M2M primarily has a structure of taking an action by receiving a command through a downlink and thereafter, reports result data through an uplink. Since main data is generally transmitted through the uplink, the uplink is central in the system that supports the M2M.

4) Power management of STA: The M2M terminal primary operates by a battery and there are many cases that it is difficult for a user to frequently charge the M2M terminal. Accordingly, a power management method for minimizing batter consumption is required.

5) Automatic recovery function: Since it is difficult for a person to operate the devices constituting the M2M system under a specific situation, the devices need a function in which the devices recover themselves.

A standard of the next-generation wireless LAN system having the M2M communication as one use case is under discussion. A remarkable feature of the wireless LAN system is that the wireless LAN system may have service coverage of 1 km radius or more in a non-licensed band of 1 GHz or less other than the TV WS band and this means that the wireless LAN system has still wider service coverage than the existing room centered wireless LAN. That is, when the wireless LAN is operated in the band of 1 GHz or less represented as 700 to 900 MHz unlike 2.4 GHz and 5 GHz of the existing wireless LAN, service coverage of the AP may be extended approximately 2 to 3 times as compared with the same transmission power due to a propagation characteristic of the corresponding band. In this case, the wireless LAN system has a feature that very many STAs may access one AP. A use case considered in the next-generation wireless LAN will be described below.

Use case 1. Sensors and meters
1a: Smart grid—meter to pole
1c: Environmental/agricultural monitoring
1d: Industrial process sensors
1e: Healthcare
1f: Healthcare
1g: Home/Building Automation
1h: Home sensors
Use case 2. Backhaul Sensor and data meter)
Backhaul aggregation of sensors
Backhaul aggregation of industrial sensors
Use case 3. Extended range Wi-Fi
Outdoor extended range hotspot
Outdoor Wi-Fi for cellular traffic offloading The case of the sensors and meters as the use case 1 is a use case regarding the M2M and various types of sensor devices access the AP of the wireless LAN system to perform the M2M communication. In particular, in the case of the smart grid, maximum 6000 sensor devices may access one AP.

The case of the backhaul sensor and data meter which is the use case 2 is a case in which an AP that provides wide coverage serves as a backhaul link of other communication system.

The use case 3 includes a case of aiming at providing hotspot communication of an outdoor extended range such as extended home service coverage, campus service coverage, and a shopping mall and a case in which the AP intends to distribute overloaded cellular traffic by off-loading traffic of cellular mobile communication.

The present invention proposes a format of a data unit for a device that operates in a band of 1 GHz or less as discussed in a next-generation wireless LAN standard. In more detail, a structure of an effective physical layer preamble for the device that operates in the band of 1 GHz or less is proposed. Data units provided below, that is, the PPDUs may be sequentially transmitted in a form of an OFDM symbol according to an inclusion sequence of fields.

In the band of 1 GHz or less, communication has considerably wider service coverage than the existing room centered wireless LAN due to the propagation characteristic. To this end, the communication may be implemented in a form to $1/10$ down-clock a physical layer (PHY) characteristic in the existing VHT wireless LAN system. In this case, the 20/40/80/160/80+80 MHz channel bandwidth in the VHT wireless LAN system is provided as a2/4/8/16/8+8 MHz channel bandwidth in the band of 1 GHz or less through $1/10$ down-clocking. As a result, the guard interval (GI) is increased from the existing 0.8 us to 8 us by 10 times. Table 5 shown below illustrates a comparison in performance between the physical layer of the VHT wireless LAN system and the physical layer in the wireless LAN system based on the band of 1 GHz or less which is $1/10$ down-clocked.

TABLE 5

| VHT wireless LAN system PHY | | Wireless LAN system based on band of 1 GHz or less which is $1/10$ down-clocked PHY | |
| --- | --- | --- | --- |
| Channel bandwidth | Throughput | Channel bandwidth | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Hereinafter, by assuming that the PHY characteristic of the VHT wireless LAN system is $1/10$ down-clocked, a case in which one OFDM (OFDM 1) symbol duration is 40 us will be described as an example for easy description. However, the range of the present invention according to the embodiment proposed in the present invention is not limited to such a specific numerical range.

Since the existing already considered legacy device does not exist in the band of 1 GHz or less, it may be important to design the PHY preamble to be effectively applied to the band of maximum 1 GHz or less without considering backward compatibility. When such a point is considered, a PPDU format of FIG. 6 is proposed.

Figure 6:
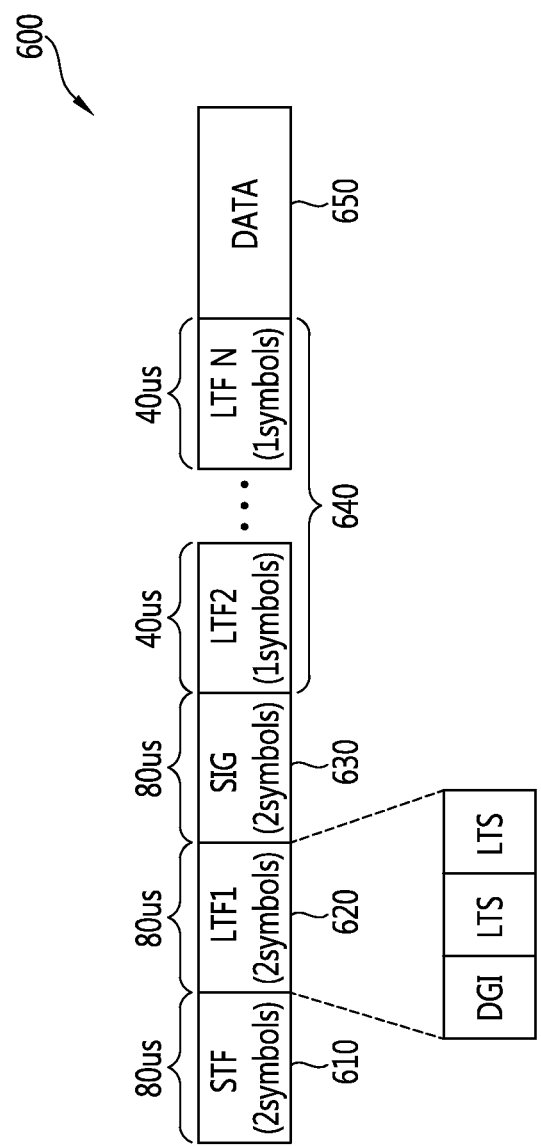
FIG. 6 is a block diagram illustrating one example of the PPDU transmitted through a band of 1 GHz or less according to the exemplary embodiment of the present invention.

FIG. 6 is a block diagram illustrating one example of the PPDU transmitted through a band of 1 GHz or less according to the exemplary embodiment of the present invention.

Referring to FIG. 6, the PPDU 600 has a structure in which an HT-GF PPDU format illustrated in the subfigure (c) of FIG. 3 is $1/10$ down-clocked. The PPDU 600 includes an STF 610, an LTF1 620, an SIG field 630, at least one LTF2 640, and at least one data field 650.

The STF 610 is used for the frame timing acquisition and the AGC. The STF 610 is constituted by two OFDM symbols and each of the OFDM symbols has an OFDM symbol duration of 40 us and has an OFDM symbol duration of 80 us by totaling up 40 us.

The LTF1 620 is used for the channel estimation. The LTF1 620 is constituted by two OFDM symbols and each of the OFDM symbols has an OFDM symbol duration of 40 us and has an OFDM symbol duration of 80 us by totaling up 40 us. The LTF1 includes a double guard interval (DGI) and two long training symbols (LTSs).

The SIG field 630 is used to demodulate and decode the data field 640. The SIG field 630 is constituted by two OFDM symbols and each of the OFDM symbols has an OFDM symbol duration of 40 us and has an OFDM symbol duration of 80 us by totaling up 40 us.

At least one LTF 640 is used in the channel estimation for demodulating the data field 650. Each LTF is constituted by one OFDM symbol and has the OFDM symbol duration of 40 us.

When the PPDU of the format according to FIG. 6 is transmitted, total 160 us is required to transmit the SIG field 630. The PPDU of such a format may be used to transmit a channel bandwidth of 2 MHz or more.

Meanwhile, for communication of extended coverage, a PPDU format illustrated in FIG. 7 below may be proposed in which each STF, LTF, SIG, and/or data field is repeated on a time or frequency axis of twice or more.

Figure 7:
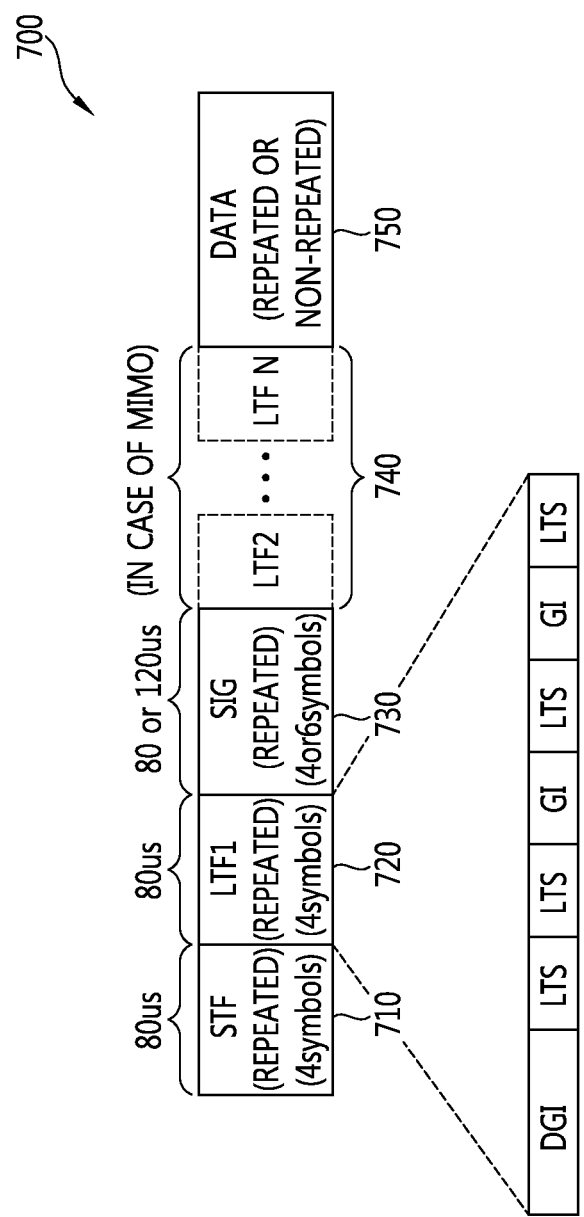
FIG. 7 is a block diagram illustrating one example of the PPDU for 1 MHz bandwidth transmission in the band of 1 GHz or less according to the exemplary embodiment of the present invention.

FIG. 7 is a block diagram illustrating one example of the PPDU for 1 MHz bandwidth transmission in the band of 1 GHz or less according to the exemplary embodiment of the present invention.

Referring to FIG. 7, the PPDU 700 may include an STF 710, an LTF1 720, an SIG field 730, and a data field 750. Additionally, the PPDU 700 may further include one or more LTFs (LTF2 to LTFN) 740 according to the number of spatial streams used when the PPDU 700 is the PPDU for the MIMO transmission.

Referring to the STF 710 and LTF1 720, it may be known that the OFDM symbol is repeatedly formed as compared with the STF 610 and the LTF1 620 of FIG. 6. That is, respective OFDM symbol(s) formed by the bit sequence constituting the STF and the LTF1 are originally repeated.

Accordingly, the STF 710 is constituted by four OFDM symbols and each of the OFDM symbols has an OFDM symbol duration of 40 us and has an OFDM symbol duration of 160 us by totaling up 40 us. The LTF1 720 is also constituted by four OFDM symbols and each of the OFDM symbols has an OFDM symbol duration of 40 us and has an OFDM symbol duration of 160 us by totaling up 40 us. That is, in the case where the PPDU illustrated in FIG. 6 is provided, a transmission time of a preamble part is 320 us and a time elapsed, which is twice more than that in the case where the PPDU of the format illustrated in FIG. 5 is transmitted.

Meanwhile, when the LTF1 720 is viewed in a time domain, since one LTF1 symbol includes a DGI and two LTSs, the DGI, two LTSs, the DIG, and two LTSs may be configured in order when simply repeated. However, the repeated LTF symbol may be implemented in a manner of applying two GIs instead of the DGI. Accordingly, the LTF1 symbol may be implemented to include the DIG, two LTSs, the GI, the LTS, the GI, and the LTS as illustrated in the figure.

Even in the SIG field 730, the OFDM symbol may be repeatedly formed, but the SIG field 730 may be repeated twice or more.

When the PPDU is transmitted through the plurality of spatial streams according to the MIMO transmission, the repetition of the OFDM symbol may be applied or not applied to at least one LTF 740 and at least one data field 750 which may be included in the PPDU 700.

The PPDU format to which the repetition of the OFDM symbol is applied as illustrated in FIG. 7 may be used for frame transmission and reception for the wider service coverage by using a channel bandwidth of 1 MHz.

Meanwhile, in the PPDU format for the 1 MHz bandwidth transmission, information that signals whether the repetition of the OFDM symbol is applied to the LTF2 to LTF N and the data field for the MIMO transmission may be required. To this end, an MCS subfield of the SIG field may be set to indicate whether the repetition of the OFDM symbol is applied.

Hereinafter, for easy description, it will be assumed that a lowest MCS level without repetition is MCS 1 and a highest MCS level will be MCS 8. In this case, generating a lower MCS level by one step by applying the OFDM symbol repetition in which the OFDM symbol set as the MCS 1 is repeated on the time axis or frequency axis is indicated as MCS 0. 9 step exist from MCS 0 to MCS 8 exist as total MCS levels and only in the case of MCS 0, the OFDM symbol repetition is applied, and as a result, a total symbol length becomes approximately twice. When the PPDU for the 1 MHz bandwidth transmission is applied, the PPDU is transmitted up to the STF, the LTF1, and the SIG field of the corresponding PPDU by applying the OFDM symbol repetition. On the contrary, the OFDM symbol repetition may be applied or not applied to one or more LTFs (LTF2 to LTFN) and one or more data fields included in the case of the MIMO transmission as described above. Whether the OFDM symbol is applied may be indicated by the MCS level. That is, when the MCS subfield of the SIG field indicates MCS0, the OFDM symbol repetition is applied even to the LTF2 to LTFN and the data field and besides, when other MCS levels are indicated, the respective LTFs may be transmitted as one OFDM symbol and the data field may also be transmitted as one or more data OFDM symbols without symbol repetition.

Meanwhile, in the case of the MIMO transmission, the lengths of all OFDM symbols are increased approximately twice by repetition in each of the LTF 2 to LTF N to which the OFDM symbol repetition is applied and in this case, structures of the increased OFDM symbols may be diversifiably implemented. This will be described with reference to FIG. 8.

Figure 8:
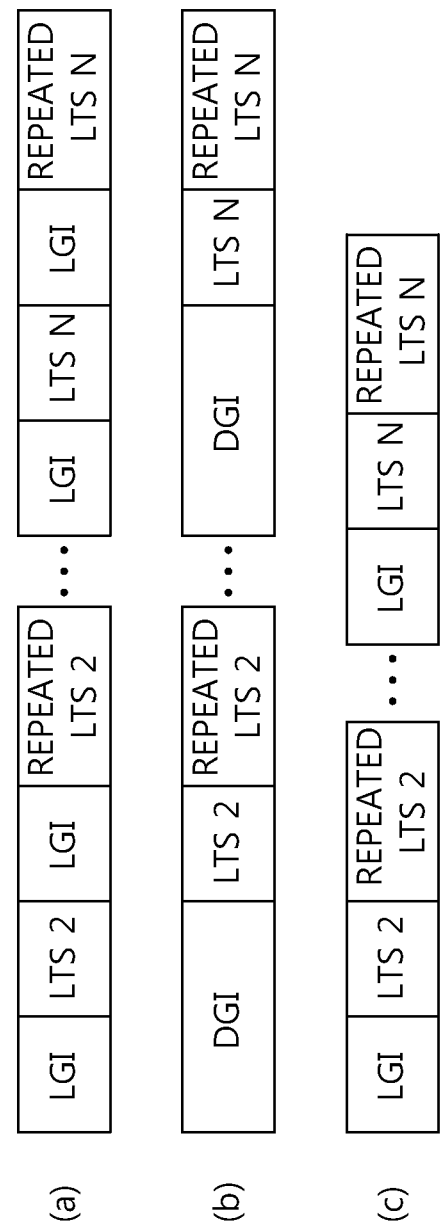
FIG. 8 is a diagram illustrating an example of an OFDM symbol structure of at least one LTF to which OFDM symbol repetition is applied according to the exemplary embodiment of the present invention.

FIG. 8 is a diagram illustrating an example of an OFDM symbol structure of at least one LTF to which OFDM symbol repetition is applied according to the exemplary embodiment of the present invention.

1) Inserting a Long Guard Interval (LGI) into a Front of Each LTS

Referring to the subfigure (a), in the respective LTF 2 to LTF N, the LGI is inserted as a cyclic prefix (CP) into fronts of both a corresponding LTS transformed to the time domain and a repeated LTS (for example, an LTS 2 and a repetition LST which is a symbol repeated in regard thereto. This scheme as a simplest (straightforward) scheme and the lengths of all OFDM symbols are increased twice against the case in which the OFDM symbol repetition is not applied.

2) Inserting the DGI

Referring to the subfigure (b), a DIG having a length acquired by totaling up two existing LGIs is inserted into a front of a time domain LTS N symbol. In this case, in a method for generating a DIG waveform, a DGI length is copied from the end of an LTS N waveform to be inserted as the CP. According to the scheme, there is an advantage in terms of a waveform characteristic that a time domain waveform in which the DGI, the LTS, and the repetition LTS are linked is continued without a non-contiguous point.

3) Inserting One LGI

Referring to the subfigure (c), the LGI is inserted into the LTS N and the front of the LTS N, instead of the DGI. However, the LGI is inserted instead of the DGI, and as a result, the lengths of all OFDM symbols are not increased twice by the OFDM symbol repetition. Such a characteristic has a characteristic that start points of the respective OFDM symbols are not maintained at the same interval, but an advantage that the total transmission time may be decreased by N*LGI.

Up to now, the format of the PPDU which may be applied to the next-generation wireless LAN system using the band of 1 GHz or less has been described. Meanwhile, in the next-generation wireless LAN system, the AP may start the sounding procedure for the beamforming transmission and the STAs may be requested to participate in the sounding procedure started by the AP.

Even in the next-generation wireless LAN system using the 1 MHz bandwidth, the sounding procedure based on the NDP may be supported. That is the AP may transmit the NDPA frame and thereafter, transmits the NDP and the STA may estimate the channel based on the NDP and transmit the feedback information to the AP.

The NDPA frame may be transmitted and received in the PPDU format for transmitting the 1 MHz bandwidth. That is, the OFDM symbol repetition is applied and the NDPA frame is thus transmitted up to the STF, the LTF1, and the SIG field in the pattern illustrated in FIG. 7. In this case, the MCS subfield in the SIG field indicates an MCS level of a subsequent data field and it may be indicated whether the OFDM symbol repetition is applied to the data field therethrough. Further, in the case of the MIMO transmission, in one or more LTFs (LTF 2 to LTF N), whether the OFDM symbol repetition is applied may be indicated by the MCS subfield. When the MCS subfield indicates the MCS 0, OFDM symbol structures of one or more LTFs (LTF 2 to LTF N) may be implemented as illustrated in FIG. 8.

However, in the case of the existing NDP, since the OFDM symbol repetition may not be applied, when the NDP according to the existing format is applied the sounding procedure of the next-generation wireless LAN system as it is, the STA may not know whether the OFDM symbol repetition is applied to at least one LTF for the MIMO channel estimation. Accordingly, in the next-generation wireless LAN system, a new NDP suitable for the next-generation wireless LAN system needs to be proposed in order to support the NDP based sounding procedure.

The NDP does not include information (field/subfield) that indicates the MCS level associated with the OFDM symbol repetition of the subsequent data field such as the MCS subfield in an SIG field of a general PPDU. That is, since the NDP is a special format PPDU without the data field, a concept called the MCS level of the data field is not applied.

Accordingly, the present invention proposes a format to which the OFDM symbol repetition is basically applied even to one or more LTFs (LTF 2 to LTF N) for the MIMO channel as well as up to the STF1, the LTF1, and the SIG field in the case of the NDP for 1 MHz transmission. That is, in the case of the NDP for the 1 MHz transmission, when no other signaling does not exist, the OFDM symbol repetition is applied and the formats of one or more LTFs (LTF 2 to LTF N) included in the NDP may be implemented as illustrated in FIG. 8.

As another format of the NDP for the 1 MHz transmission, a format in which a bit field indicating whether the OFDM symbol repetition is applied in the SIG field of the NDP. The corresponding bit field may indicate whether the OFDM symbol repetition is applied to one or more LTFs (LTF 2 to LTF N) subsequent to the rear of the SIG field. The format of the corresponding NDP may refer to FIGS. 9 and 10.

Figure 9:
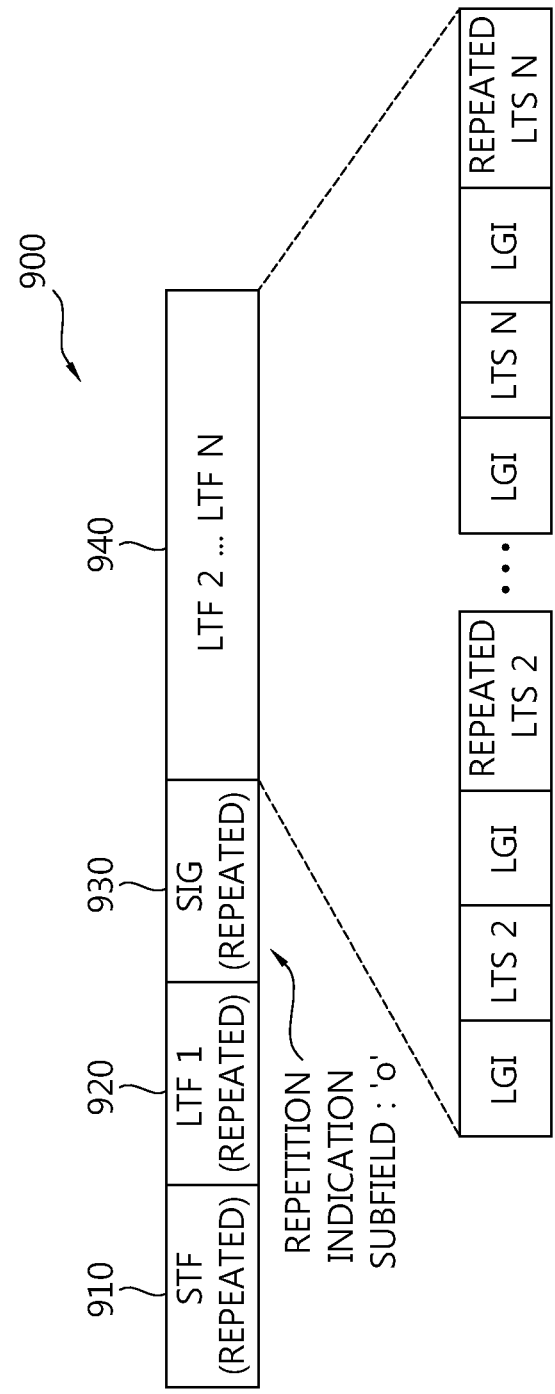
FIGS. 9 and 10 are block diagrams illustrating an example of an NDP format according to an exemplary embodiment of the present invention.
Figure 10:
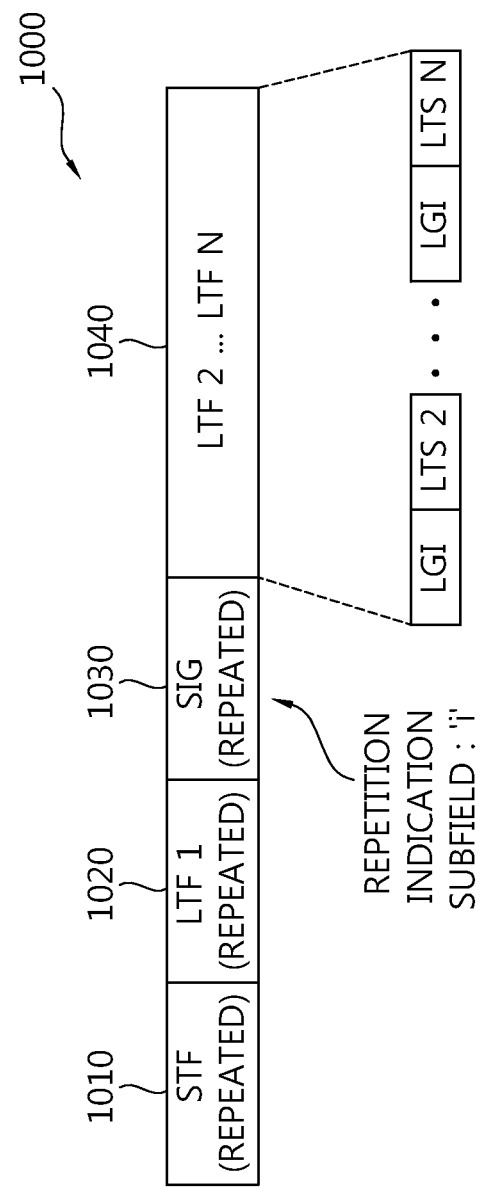

FIGS. 9 and 10 are block diagrams illustrating an example of an NDP format according to an exemplary embodiment of the present invention. FIG. 9 illustrates an NDP format when the OFDM symbol repetition is applied to one or more LTFs (LTF 2 to LTF N). FIG. 10 illustrates an NDP format when the OFDM symbol repetition is not applied to one or more LTFs (LTF 2 to LTF N).

Referring to FIGS. 9 and 10, the NDPs 900 and 1000 include STFs 910 and 1010, LTF1s 920 and 1020, SIG fields 930 and 1030, and one or more LTFs (LTF 2 to LTF N) 940 and 1040, respectively. The OFDM symbol repetition is applied to the STFs 910 and 1010, the LTF1s 920 and 1020, and the SIG fields 930 and 1030.

Meanwhile, the SIG fields 930 and 1030 include repetition indication subfields. The repetition indication subfields indicate whether the OFDM symbol repetition is applied to one or more LTFs 940 and 1040 subsequent to the SIG fields 930 and 1030.

The repetition indication subfield included in the SIG field 930 of FIG. 9 indicates that the OFDM symbol repetition is applied to the at least one LTF 940. In this case, the repetition indication subfield may be set to '0'.

The repetition indication subfield included in the SIG field 1030 of FIG. 10 indicates that the OFDM symbol repetition is applied to the at least one LTF 1040. In this case, the repetition indication subfield may be set to '1'.

Meanwhile, at least one LTF 940 to which the OFDM symbol repetition of FIG. 9 is applied may be implemented to be transmitted the OFDM symbols illustrated in FIG. 9. Further, at least one LTF 940 may be transmitted through the OFDM symbols as illustrated in the subfigures (b) and (c) of FIG. 8.

The STA that receives the NDP of the format according to the embodiment of the present invention proposed in FIGS. 9 and 10 may determine whether the OFDM symbol repetition is applied to at least one LTF subsequent according to the repetition indication subfield included in the SIG field. The channel may be estimated based on at least one LTF according to the indication of the repetition indication subfield and the feedback frame including the channel state information may be generated.

The STA that estimates the channel based on the NDP generates the feedback frame for the 1 MHz transmission. The OFDM symbol repetition is applied like the PPDU format for the 1 MHz transmission according to the embodiment of the present invention, and as a result, the feedback frame for the 1 MHz transmission may be transmitted. That is, the OFDM symbol repetition is applied to the STF, the LTF1, and the SIG field of the feedback frame, and as a result, the feedback frame is transmitted and thereafter, at least one LTF and at least one data field may be transmitted while the OFDM symbol repetition is applied or not applied according to the MCS level indicated by the MC subfield of the SIG field.

Meanwhile, the STA may generate the channel state information by estimating the channel based on the NDP according to the embodiment of the present invention. In this case, the channel state information of the feedback frame may be implemented by a channel information field and a channel information control field. The channel information control field includes information required to analyze detailed channel state information included in the channel information field. As a representative example, the channel information control field includes a channel bandwidth subfield and a grouping subfield. The channel bandwidth subfield indicates a bandwidth of the estimated channel and the grouping subfield indicates subcarrier grouping used for the beamforming feedback matrix.

The channel information field may include at least one beamforming feedback matrix for at least one subcarrier as a result of the channel estimation. Accordingly, the beamforming feedback matrix included in the channel information field may be determined based on the characteristic of the 1 MHz bandwidth channel in the 1 GHz or less band which is an operation basis of the next-generation wireless LAN system. The next-generation wireless LAN system is implemented so that the 1 MHz channel band is used, however, one OFDM symbol includes 32 subcarriers. Further, a pilot is inserted into subcarriers corresponding to subcarrier indexes −7 and 7. Accordingly, the characteristic on the physical layer of the next-generation wireless LAN system is reflected to at least one beamforming feedback matrix of the channel information field.

At least one beamforming feedback matrix is calculated for at least one subcarrier and included in the channel information field and the subcarrier associated with the beamforming feedback matrix may be specified as illustrated in Table 6 shown below.

TABLE 6

| channel bandwidth | Subcarrier grouping (Ng) | The number of subcarriers (Ns) | Subcarriers for beamforming feedback matrix fed back (scidx(0) . . . scidx(Ns − 1)) |
| --- | --- | --- | --- |
| 1 MHz | 1 | 24 | −13, −12, −11, −10, −9, −8, −6, −5, −4, −3, −2, −1, 1, 2, 3, 4, 5, 6, 8, 9, 10, 11, 12, 13 |
|  | 2 | 12 | −13, −11, −9, −5, −3, −1, 1, 3, 5, 9, 11, 13 |
|  | 4 | 8 | −13, −9, −5, −1, 1, 5, 9, 13 |
|  | 8 | 6 | −13, −5, −1, 1, 5, 13 or −13, −9, −1, 1, 9, 13 |

The Ns represents the total number of subcarriers associated with at least one beamforming feedback matrix and the Ns represents may be set differently depending on the subcarrier grouping Ng. The beamforming feedback matrix is calculated for Ns subcarriers and the calculated beamforming feedback matrix is included in the channel information field. Meanwhile, since a subcarrier corresponding to subcarrier index 0 is a subcarrier for DC tone and the subcarriers corresponding to the subcarrier indexes −7 and +7 are subcarriers for the pilot, the beamforming feedback matrix is omitted for the corresponding subcarriers.

Meanwhile, the beamforming feedback matrix may be calculated in a manner of further increasing an index interval of Table 6 twice. In this case, the subcarriers associated with the beamforming feedback matrix may be specified as illustrated in Table 7 shown below.

TABLE 7

| Channel bandwidth | Subcarrier grouping (Ng) | The number of subcarriers (Ns) | Subcarriers for beamforming feedback matrix fed back (scidx(0) . . . scidx(Ns − 1)) |
| --- | --- | --- | --- |
| 1 MHz | 1 | 24 | −13, −11, −9, −5, −3, −1, 1, 3, 5, 9, 11, 13 |
|  | 2 | 12 | −13, −9, −5, −1, 1, 5, 9, 13 |
|  | 4 | 8 | −13, −5, −1, 1, 5, 13 or −13, −9, −1, 1, 9, 13 |
|  | 8 | 6 | −13, −1, 1, 13 |

Table 7 illustrates an example of lowering feedback complexity by considering the characteristic of the physical layer of the next-generation wireless LAN system using a narrower bandwidth than the existing wireless LAN system.

Meanwhile, a scheme that mixes contents of subcarrier mapping tables illustrated in Tables 6 and 7 with each other may also be proposed. As one example, a value of Ng is not configured as four values of 1, 2, 4, and 8 as presented in Tables 6 and 7 and another grouping value may be indicated. The number of subcarriers may vary depending on the value of Ng, and as a result, the subcarrier index associated with the beamforming feedback matrix may vary.

The AP that receives the feedback frame including the channel state information implemented as above may know that the beamforming feedback matrix is fed back to a subcarrier corresponding to a specific index as illustrated in Table 6 or 7 and perform subsequent frame transmission and reception based on the beamforming feedback matrix for each provided subcarrier.

Additionally, as a scheme of changing the total number of subcarriers that need to calculate the beamforming feedback matrix according to the Ng and/or Ns value, a scheme of dividing the entire channel bandwidth to several subbands and differently applying the value of Ng (alternatively, Ns) for each of bandwidths of respective subchannels is proposed.

Figure 11:
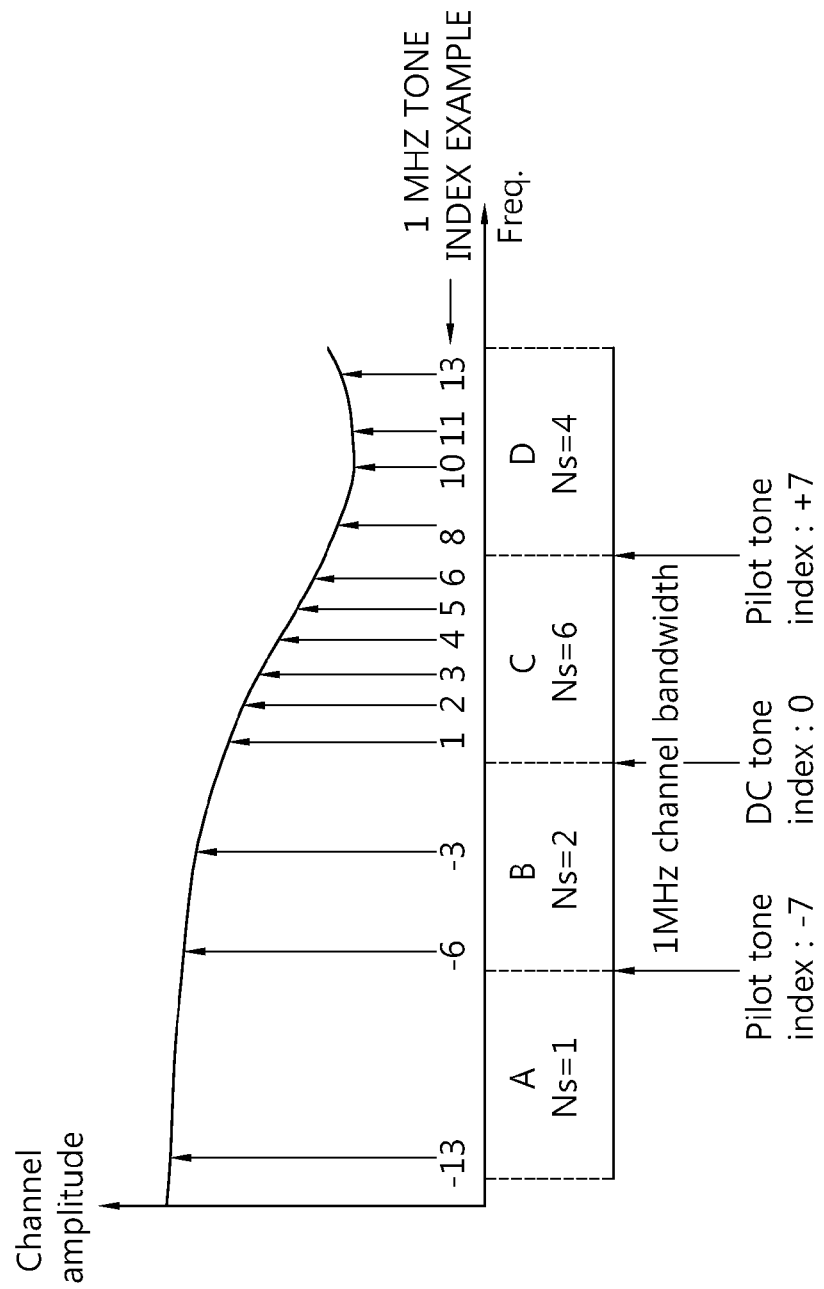
FIG. 11 is a diagram illustrating one example of selection of a subcarrier associated with a beamforming feedback matrix according to an exemplary embodiment of the present invention.

FIG. 11 is a diagram illustrating one example of selection of a subcarrier associated with a beam forming feedback matrix according to an exemplary embodiment of the present invention.

Referring to FIG. 11, the 1 MHz channel band is divided into total four subbands (subband to subband) and Ns is set differently for each subband. Therefore, the channel state information may be more efficiently compressed by varying the number of subcarriers associated with the beamforming feedback matrix to be fed back for each section. A detailed example of the Ns value which may be allocated for each section may be illustrated in Table 8 shown below.

TABLE 8

| Channel bandwidth | Subband | The number of subcarriers (Ns) | Subcarriers for beamforming feedback matrix fed back (scidx(0) . . . scidx(Ns − 1)) |
| --- | --- | --- | --- |
| 1 MHz | A | 1 | −13 |
|  |  | 2 | −13, |
|  |  | 4 | −13, −11, −10, −8 |
|  |  | 6 | −13, −12, −11, −10, −9, −8 |
|  | B | 1 | −6 |
|  |  | 2 | −6, −3 |
|  |  | 4 | −6, −4, −3, −1 |
|  |  | 6 | −6, −5, −4, −3, −2, −1 |
|  | C | 1 | 6 |
|  |  | 2 | 3, 6 |
|  |  | 4 | 1, 3, 4, 6 |
|  |  | 6 | 1, 2, 3, 4, 5, 6 |

TABLE 8-continued

| Channel bandwidth | Subband | The number of subcarriers (Ns) | Subcarriers for beamforming feedback matrix fed back (scidx(0) ... scidx(Ns − 1)) |
|---|---|---|---|
| | D | 1 | 13 |
| | | 2 | 10, 13 |
| | | 4 | 8, 10, 11, 13 |
| | | 6 | 8, 9, 10, 11, 12, 13 |

Meanwhile, an example described with reference to FIG. 11 and Table 8 is just one example of a method that divides the 1 MHz channel band into a plurality of subbands and differently sets the number of subcarriers in which the beamforming feedback matrix is calculated for each subband. Referring to the figure and the table, in the embodiment of the present invention, an entire channel band is divided into a section having high frequency selectivity and a section having low frequency selectivity for each subcarrier index and small Ns is applied to a section having a small variation amount to perform coarse feedback and high Ns is applied to a section having a large variation amount to perform fine feedback. Accordingly, except for a scheme of dividing the 1 MHz channel band into four subbands such as the subbands A to D, the 1 MHz channel band may be divided into more subbands or less subbands and the number of Nss applied for each subband may also vary.

Figure 12:
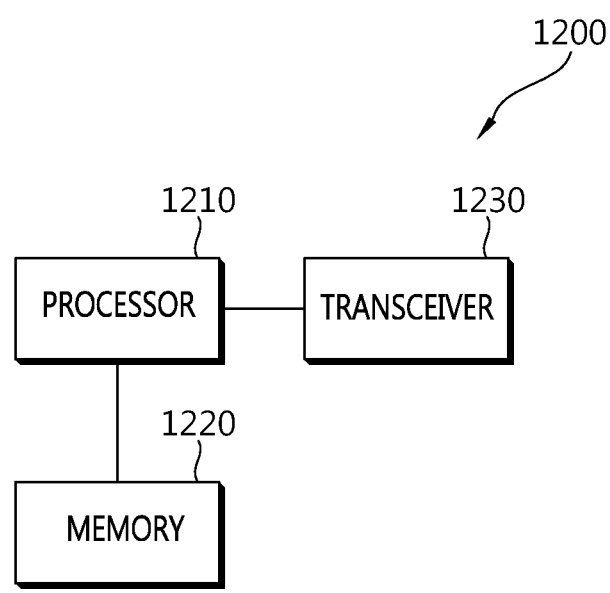
FIG. 12 is a block diagram illustrating a wireless apparatus in which an exemplary embodiment of the present invention can be implemented.

FIG. 12 is a block diagram illustrating a wireless apparatus in which an exemplary embodiment of the present invention can be implemented.

Referring to FIG. 12, the wireless apparatus 1200 includes a processor 1210, a memory 1220, and a transceiver 1230. The transceiver 1230 transmits and/or receives a radio signal, however, implements a physical layer of IEEE 802.11. The processor 1210 may be set to operate in functional connection with the transceiver 1230. The processor 1210 may be set to perform the channel sounding method according to the embodiment based on FIGS. 6 to 11.

The processor 1210 and/or transceiver 1230 may include an application-specific integrated circuit (ASIC), other chipset, a logic circuit, and/or a data processing device. When the embodiment is implemented by software, the aforementioned technique may be implemented by a module (a process, a function, and the like) that perform the aforementioned function. The module may be stored in the memory 1220 and may be executed by the processor 1210. The memory 1220 may be included in the processor 1210 and functionally connected with the processors 1210 by various means which is separately positioned and known.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing channel sounding in a wireless LAN system, the method comprising the steps of:
transmitting a null data packet announcement (NDPA) frame to announce a transmission of a null data packet (NDP);
transmitting the NDP; and
receiving a feedback frame from a station (STA),
wherein the feedback frame includes channel state information generated based on the NDP,
wherein the NDP includes a signal field, a first long training field (LTF) used in channel estimation for decoding the signal field and a second LTF used in channel estimation for a multiple input multiple output (MIMO) channel,
wherein the signal field includes a repetition indication subfield,
wherein the repetition indication subfield indicates whether orthogonal frequency division multiplexing (OFDM) symbol repetition is applied to the second LTF,
wherein the first LTF is transmitted as an OFDM symbol for the first LTF and as a repetition OFDM symbol in which the first LTF is repeated regardless of the repetition indication subfield, and
wherein when the repetition indication subfield indicates that the OFDM symbol repetition is not applied to the second LTF, the second LTF is transmitted as a first long training symbol (LTS) for each LTF.

2. The method of claim 1, wherein:
the signal field is transmitted as an OFDM symbol for the signal field and a repetition OFDM symbol in which the signal field is repeated.

3. The method of claim 1, wherein a long guard interval (LGI) is inserted in front of the first LTS.

4. The method of claim 1, wherein
when the repetition indication subfield indicates that the OFDM symbol repetition is applied to the second LTF, the second LTF is transmitted as a second long training symbol (LTS) for each LTF and as a repetition LTS for a repetition LTF in which the each LTF is repeated.

5. The method of claim 4, wherein a long guard interval (LGI) is inserted in front of the second LTS and the repetition LTS.

6. The method of claim 4, wherein a double guard interval (DGI) is inserted in front of the second LTS and the repetition LTS.

7. The method of claim 4, wherein a first long guard interval (LGI) is inserted in front of the second LTS, and a second long guard interval (LGI) is inserted in front of the repetition LTS.

8. The method of claim 1, wherein the NDPA frame, the NDP, and the feedback frame are transmitted through a 1 MHz channel in a frequency band of 1 GHz or less.

9. A wireless apparatus that operates in a wireless LAN system, the apparatus comprising:
a transceiver configured to transmit and receive a radio signal; and
a processor configured to operate in functional association with the transceiver,
wherein the processor:
transmits a null data packet announcement (NDPA) frame to announce to a transmission of a null data packet (NDP),
transmits the NDP, and
receives a feedback frame from a station (STA),
wherein the feedback frame includes channel state information generated based on the NDP,
wherein the NDP includes a signal field, a first long training field (LTF) for channel estimation for decoding the signal field and a second LTF for channel estimation of a multiple input multiple output (MIMO) channel,
wherein the signal field is transmitted as an OFDM symbol for the signal field and as a repetition OFDM symbol in which the signal field is repeated, wherein the signal field includes a repetition indication subfield, wherein the repetition indication subfield indicates whether orthogonal frequency division multiplexing (OFDM) symbol repetition is applied to the second LTF, wherein the first LTF is transmitted as an OFDM symbol for the first LTF and as a repetition OFDM symbol in which the first LTF is repeated regardless of the repetition indication subfield, and wherein when the repetition indication subfield indicates that the 01-DM symbol repetition is not applied to the second LTF, the second LTF is transmitted as a first long training symbol (LTS) for each LTF.

10. The wireless apparatus of claim 9, wherein:
the signal field is transmitted as an OFDM symbol for the signal field and a repetition OFDM symbol in which the signal field is repeated.

11. The wireless apparatus of claim 9, wherein a long guard interval (LGI) is inserted in front of the first LTS.

12. The wireless apparatus of claim 9, wherein:
when the repetition indication subfield indicates that the OFDM symbol repetition is applied to the second LTF, the second LTF is transmitted as a second long training symbol (LTS) for each LTF and as a repetition LTS for a repetition LTF in which the each LTF is repeated.

13. The wireless apparatus of claim 12, wherein a long guard interval (LGI) is inserted in front of the second LTS and the repetition LTS.

14. The wireless apparatus of claim 12, wherein the double guard interval (DGI) is inserted the second LTS and the repetition LTS.

15. The wireless apparatus of claim 12, wherein a first long guard interval (LGI) is inserted in front of the second LTS, and a second long guard interval (LGI) is inserted in front of the repetition LTS.

16. The wireless apparatus of claim 9, wherein the NDPA frame, the NDP, and the feedback frame are transmitted through a 1 MHz channel in a frequency band of 1 GHz or less.

* * * * *